(12) United States Patent
Panda

(10) Patent No.: US 12,317,954 B2
(45) Date of Patent: *Jun. 3, 2025

(54) HEEL TIP CUSHION WITH ANCHORING MECHANISM INSIDE HEEL STEM

(71) Applicant: El A. Panda, Chicago, IL (US)

(72) Inventor: El A. Panda, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/635,977

(22) Filed: Apr. 15, 2024

(65) Prior Publication Data

US 2024/0260716 A1    Aug. 8, 2024

Related U.S. Application Data

(63) Continuation of application No. 17/714,581, filed on Apr. 6, 2022, now Pat. No. 11,957,209, which is a
(Continued)

(51) Int. Cl.
| | |
|---|---|
| *A43B 21/26* | (2006.01) |
| *A43B 1/00* | (2006.01) |
| *A43B 21/30* | (2006.01) |
| *A43B 21/38* | (2006.01) |
| *A43B 13/22* | (2006.01) |
| *A43B 21/06* | (2006.01) |
| *A43B 21/42* | (2006.01) |
| *A43B 21/433* | (2006.01) |
| *A43B 21/46* | (2006.01) |
| *B33Y 80/00* | (2015.01) |

(52) U.S. Cl.
CPC ............ *A43B 21/26* (2013.01); *A43B 1/0009* (2013.01); *A43B 21/30* (2013.01); *A43B 21/38* (2013.01); *A43B 13/223* (2013.01); *A43B 21/06* (2013.01); *A43B 21/42* (2013.01); *A43B 21/433* (2013.01); *A43B 21/46* (2013.01); *B33Y 80/00* (2014.12)

(58) Field of Classification Search
CPC ......... A43B 21/00; A43B 21/24; A43B 21/26; A43B 21/30; A43B 21/36; A43B 21/40
See application file for complete search history.

(56) References Cited

U.S. PATENT DOCUMENTS

| | | | | |
|---|---|---|---|---|
| 1,220 A | * | 7/1839 | Duntze | E05C 1/16 |
| | | | | 292/169.21 |
| 1,691,064 A | * | 11/1928 | Hoppe | A43C 11/24 |
| | | | | 411/338 |

(Continued)

*Primary Examiner* — Jillian K Pierorazio
(74) *Attorney, Agent, or Firm* — ICE MILLER LLP; Justin D. Swindells

(57) ABSTRACT

A high heel footwear including a heel tip assembly and a heel assembly. The heel tip assembly includes a top lift abutting against the heel, a rigid shaft member having a threaded portion, and a first wedge-lock feature configured to prevent the top lift from rotating. The heel assembly includes a threaded insert, a spring, a hollow insert, and a second wedge-lock feature. The threaded insert is received inside an opening formed in the heel to receive the threaded portion of the rigid shaft member. The spring is also received inside the opening and abuts against the threaded insert. The hollow insert abuts against the spring. The rigid shaft member passes through the threaded insert, the spring, and the hollow insert. The second wedge-lock feature locks with the first wedge-lock feature to retain the top lift on the end of the heel.

12 Claims, 21 Drawing Sheets

Related U.S. Application Data continuation of application No. 16/575,136, filed on Sep. 18, 2019, now Pat. No. 11,523,659, and a continuation of application No. 16/148,699, filed on Oct. 1, 2018, now Pat. No. 11,297,900, said application No. 16/575,136 is a continuation-in-part of application No. 15/488,269, filed on Apr. 14, 2017, now abandoned, said application No. 16/148,699 is a continuation-in-part of application No. 15/488,269, filed on Apr. 14, 2017, now abandoned.

(56) References Cited

U.S. PATENT DOCUMENTS

| | | | | |
|---|---|---|---|---|
| 1,854,057 | A * | 4/1932 | Norris | A43B 21/47 36/42 |
| 1,977,777 | A * | 10/1934 | Rhodes | A43B 21/42 36/36 R |
| 2,263,186 | A * | 11/1941 | Parkhurst | A43B 21/42 36/36 R |
| 2,523,652 | A * | 9/1950 | Dowd | A43C 15/161 411/141 |
| 2,875,532 | A * | 3/1959 | Fitzsimmons | A43B 21/47 36/34 R |
| 2,923,071 | A * | 2/1960 | Whitted | A43B 21/52 36/36 R |
| 2,935,799 | A * | 5/1960 | Ronci | A43B 21/24 36/34 A |
| 2,937,461 | A * | 5/1960 | Trela | A43B 21/52 36/36 R |
| 3,034,234 | A * | 5/1962 | Portelli | A43B 21/433 36/36 R |
| 3,040,452 | A * | 6/1962 | Whitted, Jr. | A43B 21/24 36/34 A |
| 3,041,744 | A * | 7/1962 | Brauner | A43B 21/24 36/34 R |
| 3,055,125 | A * | 9/1962 | Ronci | A43B 21/42 36/34 A |
| 3,074,187 | A * | 1/1963 | Klein | A43B 21/42 36/42 |
| 3,106,791 | A * | 10/1963 | Ball | A43B 21/20 411/452 |
| 3,119,192 | A * | 1/1964 | Ronci | A43B 21/36 36/34 A |
| 3,134,180 | A * | 5/1964 | Stone | A43B 21/36 411/480 |
| 3,178,835 | A * | 4/1965 | Burke | A43B 21/36 36/34 A |
| 3,196,560 | A * | 7/1965 | Powell | A43B 21/36 36/34 R |
| 3,200,518 | A * | 8/1965 | Rasmussen | A43B 21/36 D2/966 |
| 3,225,465 | A * | 12/1965 | Ball | A43B 21/36 36/34 A |
| 3,266,177 | A * | 8/1966 | Holden | A43B 21/50 36/36 C |
| 3,473,241 | A * | 10/1969 | Piero | A43B 21/42 36/42 |
| 3,514,879 | A * | 6/1970 | Frattallone | A43B 21/46 D2/966 |
| 3,805,418 | A * | 4/1974 | Matuka | A43B 21/50 36/34 A |
| 3,977,095 | A * | 8/1976 | Phillips | A43B 21/437 36/42 |
| 4,403,426 | A * | 9/1983 | Kaplan | A43B 21/42 36/35 A |
| 4,424,635 | A * | 1/1984 | Jourdan | A43B 21/24 36/34 A |
| 4,819,344 | A * | 4/1989 | Schuller | A43B 21/36 36/35 A |
| 4,848,008 | A * | 7/1989 | Kuehnle | A43B 21/26 36/35 R |
| 5,063,691 | A * | 11/1991 | Haug | A43B 21/26 36/35 R |
| 5,325,612 | A * | 7/1994 | Lock | B29D 35/081 36/34 A |
| 5,524,365 | A * | 6/1996 | Goldenberg | A43B 21/36 36/36 C |
| 5,581,910 | A * | 12/1996 | Lewis | A43B 1/0054 36/42 |
| 5,626,449 | A * | 5/1997 | McKinlay | F16B 39/282 411/533 |
| 6,023,858 | A * | 2/2000 | Srourian | A43B 21/42 36/11.5 |
| 6,442,872 | B1 * | 9/2002 | Liao | A43C 15/161 36/114 |
| 6,467,198 | B1 * | 10/2002 | James | A43B 7/32 36/72 A |
| 6,895,695 | B1 * | 5/2005 | Chen | A43B 21/38 36/3 R |
| 7,578,075 | B1 * | 8/2009 | Kemp | A43B 21/38 36/100 |
| 9,220,317 | B2 * | 12/2015 | Green | A43B 13/04 |
| 9,781,973 | B2 * | 10/2017 | Singh | A43B 21/39 |
| 2003/0074807 | A1 * | 4/2003 | Sato | A43B 21/46 36/36 R |
| 2005/0160629 | A1 * | 7/2005 | Jungkind | A43C 15/161 36/127 |
| 2006/0213082 | A1 * | 9/2006 | Meschan | A43B 13/182 36/27 |
| 2008/0034620 | A1 * | 2/2008 | Gallegos | A43B 21/30 36/36 R |
| 2008/0244931 | A1 * | 10/2008 | Gallegos | A43B 1/0081 36/100 |
| 2009/0199375 | A1 * | 8/2009 | Koelling | A63C 17/017 24/700 |
| 2013/0025165 | A1 * | 1/2013 | Hunter | A43B 23/24 36/136 |
| 2014/0082972 | A1 * | 3/2014 | Jones | A43B 7/144 36/34 R |
| 2014/0196319 | A1 * | 7/2014 | Rupprecht | A43B 21/26 36/105 |
| 2017/0347751 | A1 * | 12/2017 | Leiber | A43B 21/48 |

* cited by examiner

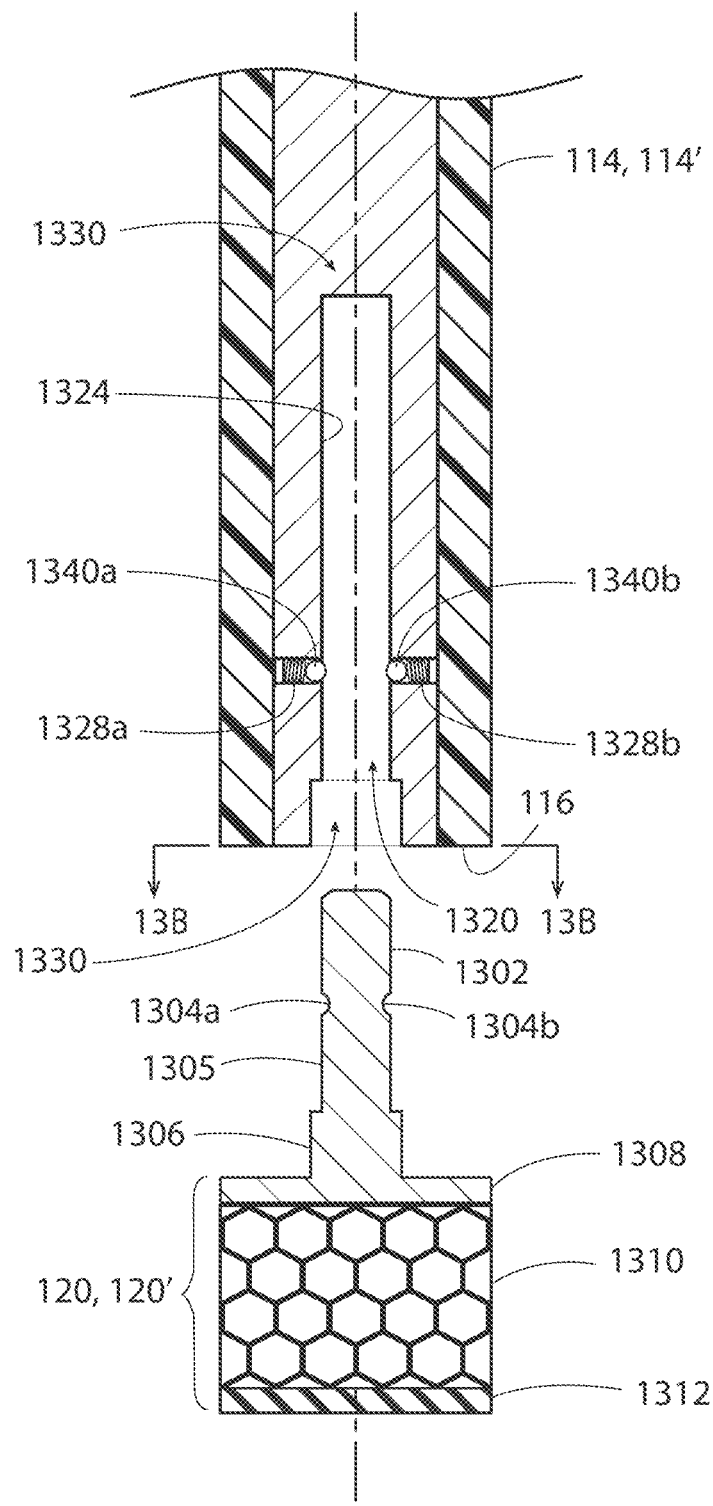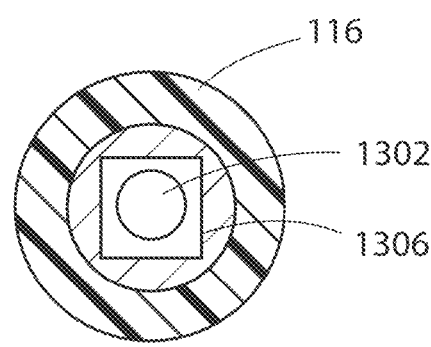
FIG. 13A
FIG. 13B

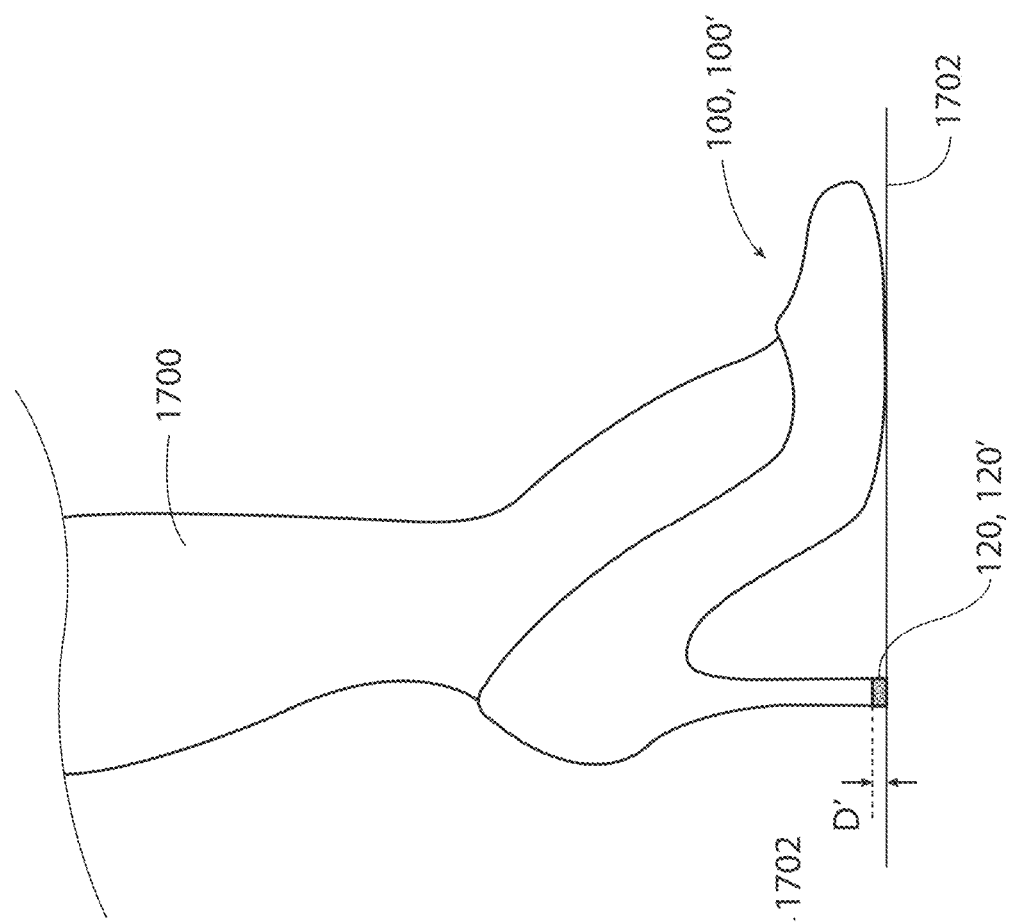
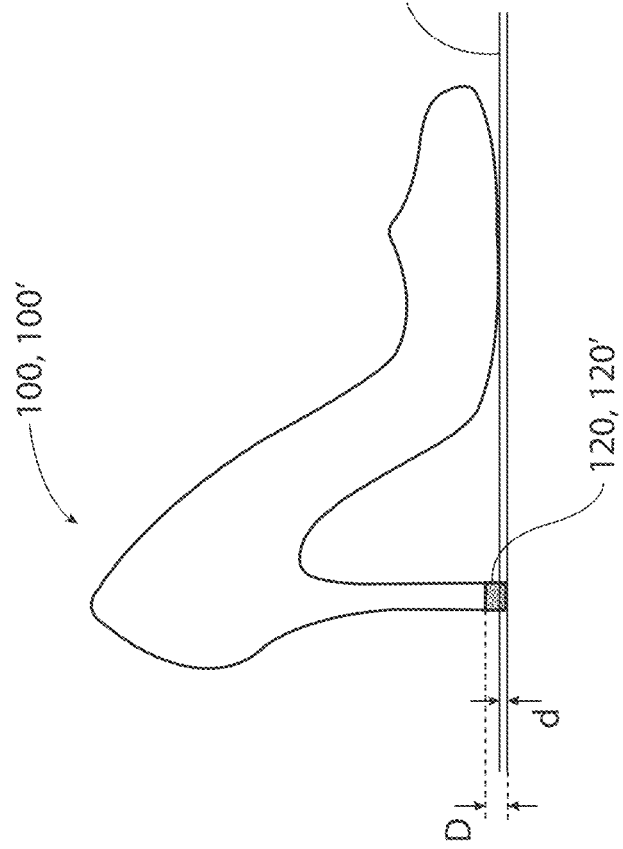
FIG. 17A
FIG. 17B

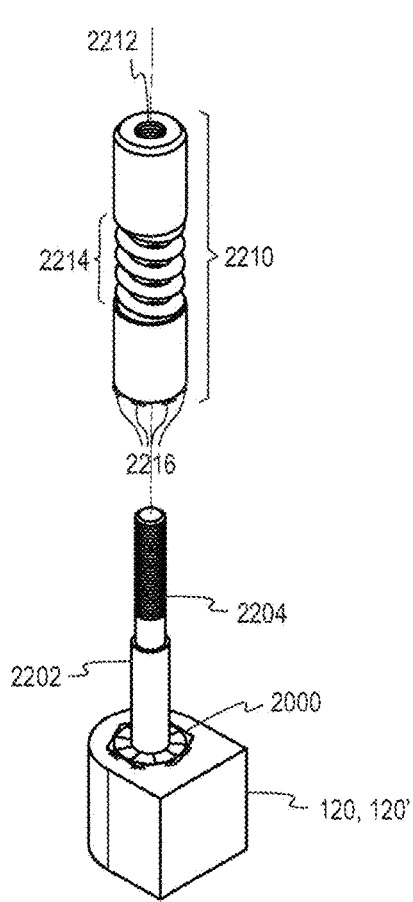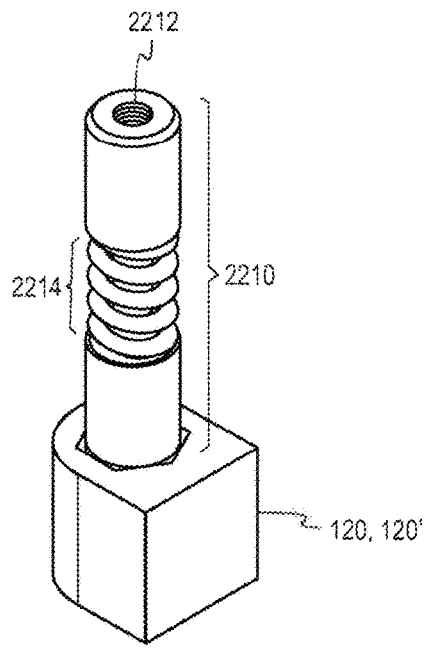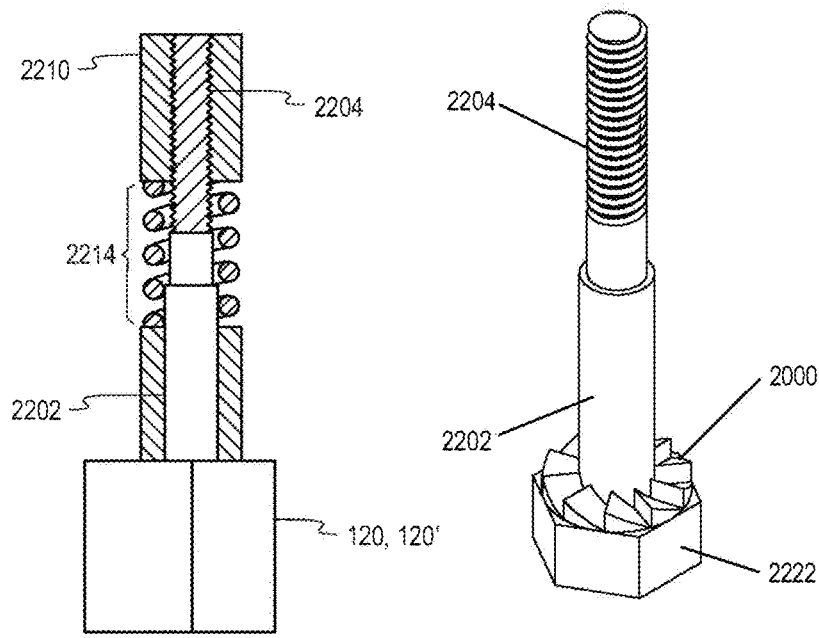
Fig. 22A
Fig. 22B
Fig. 22C
Fig. 22D

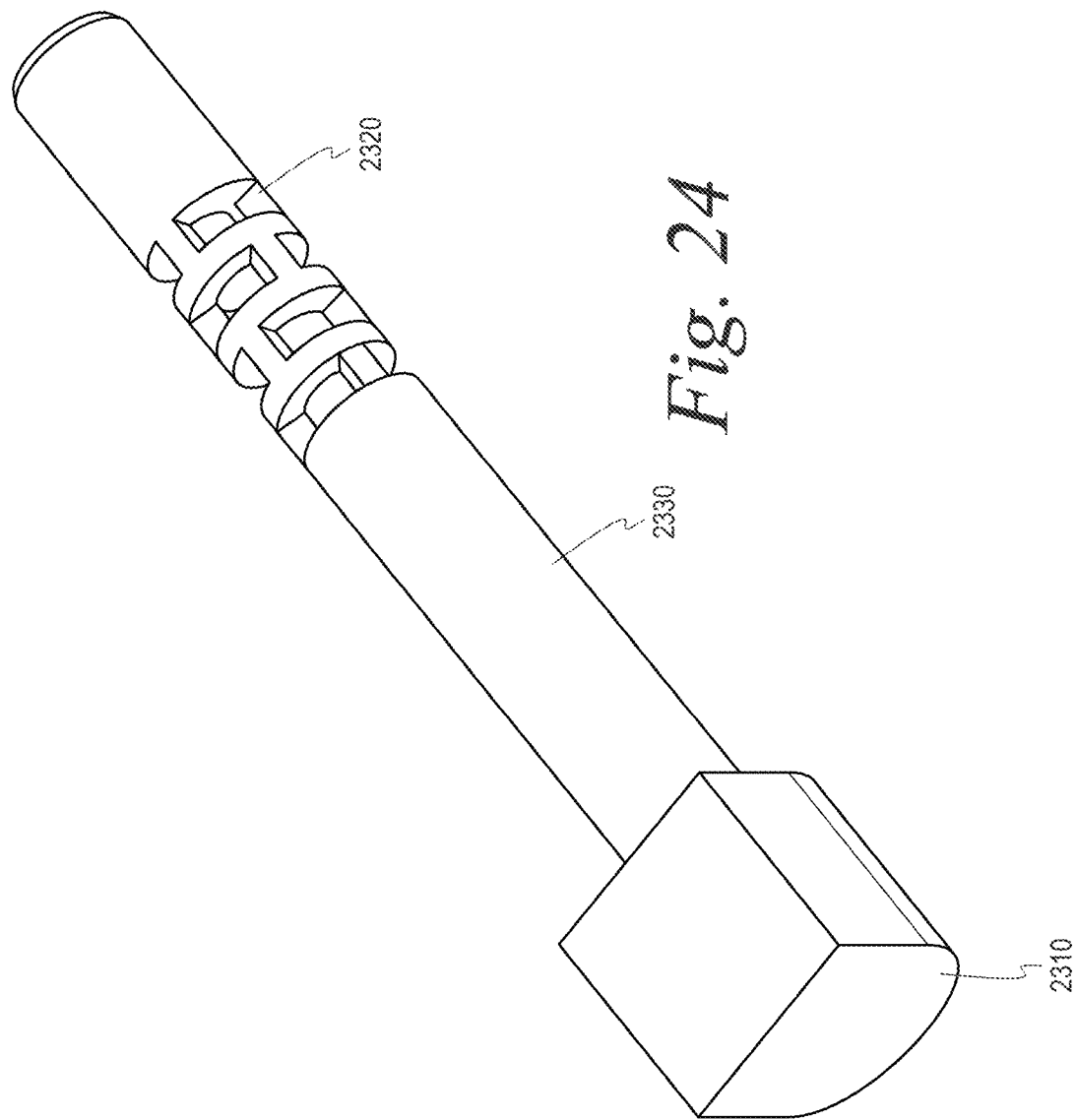

HEEL TIP CUSHION WITH ANCHORING MECHANISM INSIDE HEEL STEM

CROSS-REFERENCE TO RELATED APPLICATIONS

This application is a continuation of U.S. patent application Ser. No. 17/714,581 filed Apr. 6, 2022 and now allowed, which is a continuation of U.S. patent application Ser. No. 16/148,699 filed Oct. 1, 2018 and issued as U.S. Pat. No. 11,297,900, which is a continuation-in-part of U.S. patent application Ser. No. 15/488,269 filed Apr. 14, 2017, now abandoned. U.S. patent application Ser. No. 17/714,581 is also a continuation of U.S. patent application Ser. No. 16/575,136 filed Sep. 18, 2019 and issued as U.S. Pat. No. 11,523,659, which is a continuation-in-part of U.S. patent application Ser. No. 15/488,269 filed Apr. 14, 2017, now abandoned. The content of all above-mentioned applications is incorporated by reference herein in its entirety.

FIELD OF THE INVENTION

The present disclosure relates to high heel footwear, and more particularly to a top lift assembly of a heel stem having an anchoring mechanism and a cushioning feature.

BACKGROUND

Existing designs of the heel tip for a high heel have many drawbacks and flaws, including the materials used, design and engineering of the heel tip, and how it is attached to the heel. Heel tips are used for protection against the severe abrasive pressure on the heel during normal walking. Various types of heel tips have been devised, but at the present time, conventional heel tips consist of a hard polyurethane or plastic/rubber mix molded around a metal nail head with the nail stem protruding beyond the polyurethane material. To securely fasten the heel tip to the heel, the nail stem is driven into a bore extending along the inside of the heel.

A large amount of stress and pressure is concentrated on a heel tip from the impact against the ground, especially when walking on uneven or high-friction surfaces such as concrete. Such forces, coupled with the small surface area of the heel, often cause heel tips to wear out or get pulled out of or dislodged from the heel within a few weeks of wear.

When heel tips need to be replaced, most people delay the replacement and continue to walk on worn out heel tips, sometimes wearing the heel tips away completely until remnants of the metal nail head are all that remain. Walking on worn out heel tips involves a variety of adverse and potentially dangerous side effects.

First, the harmful shock waves that are transmitted through the body as the metal nail head hits the surface can cause damage ranging from the feet all the way up to the neck. Second, the nail head can mark, scrape and damage floors. Also, the metal nail head is very smooth, which increases the risk of slipping or falling while walking. As a result, walking on a worn-out heel tip can cause damage to the heel by fraying, erosion, and other destruction from friction. Lastly, the exposed metal nail makes a loud, distinct clicking sound as it strikes the ground during walking which is audibly distracting to the wearer and to others.

Aspects of the present disclosure overcome these and other problems.

BRIEF SUMMARY

Aspects of the present disclosure solve or overcome at least the above-stated problems and disadvantages. Currently, there is no commercially available heel tip that does not wear out within a few weeks of use. A wearer must or ought to replace the heel tips, on average, every 30 days if that heel tip can even stay attached to the heel that long. An objective of aspects of the present disclosure is to provide a stronger heel tip that can take years of use and abuse before it starts to deteriorate, cannot get pulled out of the heel when worn and used and will help to absorb the harmful shock waves that are sent throughout the entire body with every step.

The heel tip is made of longer-wearing, resilient materials. One of these materials protects the body from the harmful shockwaves that are caused by every step, jump or stride that the high-heel wearer takes. It has been demonstrated in several studies that the rubber material of this invention stops the harmful shock waves that accumulate over time as damage to the body from our feet to the base of our skull from the repeated exposure the shock waves caused by daily activity.

Conventional heel tips are made of solid polyurethane, which does not deter the damage from the exposure of the shock waves that can cause numerous chronic injuries. By contrast, according to the present disclosure, some aspects provide a micro honeycomb internal structure in the heel tip to decrease the shock waves the body is absorbing as the high-heel wearer walks, runs or jumps. The micro honeycomb significantly decreases both the amplitude of the high frequency forces and their ability to propagate up into the body thus eliminating chronic pain and injuries that can diminish the high-heel wearer's ability to function at a normal level.

Furthermore, conventional heel tips have a nail or a steel pin that protrudes from the polyurethane material and is hammered or driven into the bore of the heel to hold the heel tip in place against the heel. By contrast, aspects of the present disclosure provide various combinations of anti-rotation, securing, and alignment promoting features to prevent rotation or slippage of the heel tip, secure the heel tip to the heel in a fixed, unmovable manner, and align the heel tip to the heel. According to some aspects of the present disclosure, a threaded insert or expansion anchor can be set in the heel and the heel tip, which can include a square or propeller head screw, with the micro honeycomb structure, is then rotated until the threaded insert locks the screw into place or the expansion anchor opens, locking the screw and heel tip securely into the heel. Optionally, the heel tip can be removed easily, by counter-rotating it, for example, to replace it with a new one or swap it entirely out for a different style.

According to an aspect of the present disclosure, a high heel footwear is disclosed, wherein the high heel footwear further includes a heel tip assembly and a heel assembly. The heel tip assembly is configured to be coupled with a heel of a high heel footwear. The heel tip assembly includes a top lift, a rigid shaft member, and a first wedge-lock feature. The top lift can be configured to abut an end of the heel of the high heel footwear. The rigid shaft member can extend away from the top lift and have a threaded portion. The first wedge-lock feature can prevent the top lift from rotating relative to the heel when the top lift is fully secured to the heel by the threaded portion. The heel assembly can include a threaded insert, a spring, a hollow insert, and a second wedge-lock feature. The threaded insert can be received inside an opening formed in the heel to receive the threaded portion of the rigid shaft member. The spring can also be received inside the opening and can abut the threaded insert. The spring can receive the rigid shaft member. The hollow insert can be received inside the opening and abut the spring. The hollow insert can also receive the rigid shaft member. The second wedge-lock feature can be at the end of the heel and can lock with the first wedge-lock feature. The top lift will therefore be retained relative to the end of the heel.

In some examples, the hollow insert can have a conical shape and can be press-fit into the opening.

In some examples, the first wedge-lock feature can include an alignment feature configured to align the top lift relative to the heel. The alignment can occur such that an irregular outer profile of the top lift co-aligns with a corresponding irregular outer profile of the heel at an interface between the top lift and the heel.

In some examples, the first wedge-lock feature and the second wedge-lock feature can be composed of metal or a material that includes metal.

In some examples, the spring can be a helical spring. The helical spring can compress as the threaded portion is screwed into the threaded insert.

In some examples, a top portion of the top lift lies on a horizontal plane below a horizontal plane of a bottommost part of a sole of the high heel footwear in an unloaded configuration. Therefore, the top lift can compress under a loaded configuration such that the top portion lies on the same horizontal plane as the bottommost part of the sole.

In some examples, the first wedge-lock feature can be composed of a material including a metal. The first wedge-lock feature can be secured to the top lift.

In some examples, the base portion can be composed of a tire tread material

Another embodiment of the present disclosure can provide a heel assembly for high heel footwear. The heel assembly can include a threaded insert, a shaft member, and a top lift. The threaded insert can be received in an opening formed in a heel of the high heel footwear.

The threaded insert can further include an elastic portion and a threaded interior end portion. The shaft member can include a threaded end portion. The shaft member can be configured to be received in a hollow interior of the threaded insert. The top lift can be configured to couple with the end of the shaft member and abut an end of the high heel footwear.

In some examples, the threaded insert, the shaft member, and the top lift comprise 3D-printed material.

In some examples, the elastic portion can be a helical spring.

In some examples, the threaded insert can compress at the elastic portion in response to threading the threaded end portion of the shaft member into the threaded interior end portion of the threaded insert.

In some examples, the heel assembly can further include an adhesive element between the threaded insert and the heel opening.

In some examples, the shaft member can include a polygonal head. The top lift can include a polygonal cutout portion configured to receive the polygonal head of the shaft member.

In some examples, the threaded insert can form an interference fit against the opening in the heel of the high-heel footwear.

In some examples, the top lift can be coupled with the end of the shaft member. The shaft member can be received into the hollow interior of the threaded insert and screwed into the threaded interior. For example, a user can perform the coupling and screwing steps. Therefore, the heel assembly can form a unitary element. The unitary element cannot be disassembled without an applied force. Such an applied force must unscrew the shaft member with a force greater than a compression force of the elastic member. For example, a user can unscrew the shaft member with an appropriate force.

BRIEF DESCRIPTION OF THE DRAWINGS

FIGS. 13A and 13B illustrate yet another way of securing any top lift into any heel disclosed herein using springs inside the heel.

FIGS. 17A and 17B illustrate how the top lift can be slightly longer than the outsole of the high heel footwear when no load is present in the footwear.

FIGS. 22A-22D show an exemplary heel tip assembly having a top lift with a rigid shaft and insert according to another aspect of the present disclosure.

FIG. 24 shows still another exemplary heel tip assembly according to another embodiment of the present disclosure.

DETAILED DESCRIPTION

Figure 1:
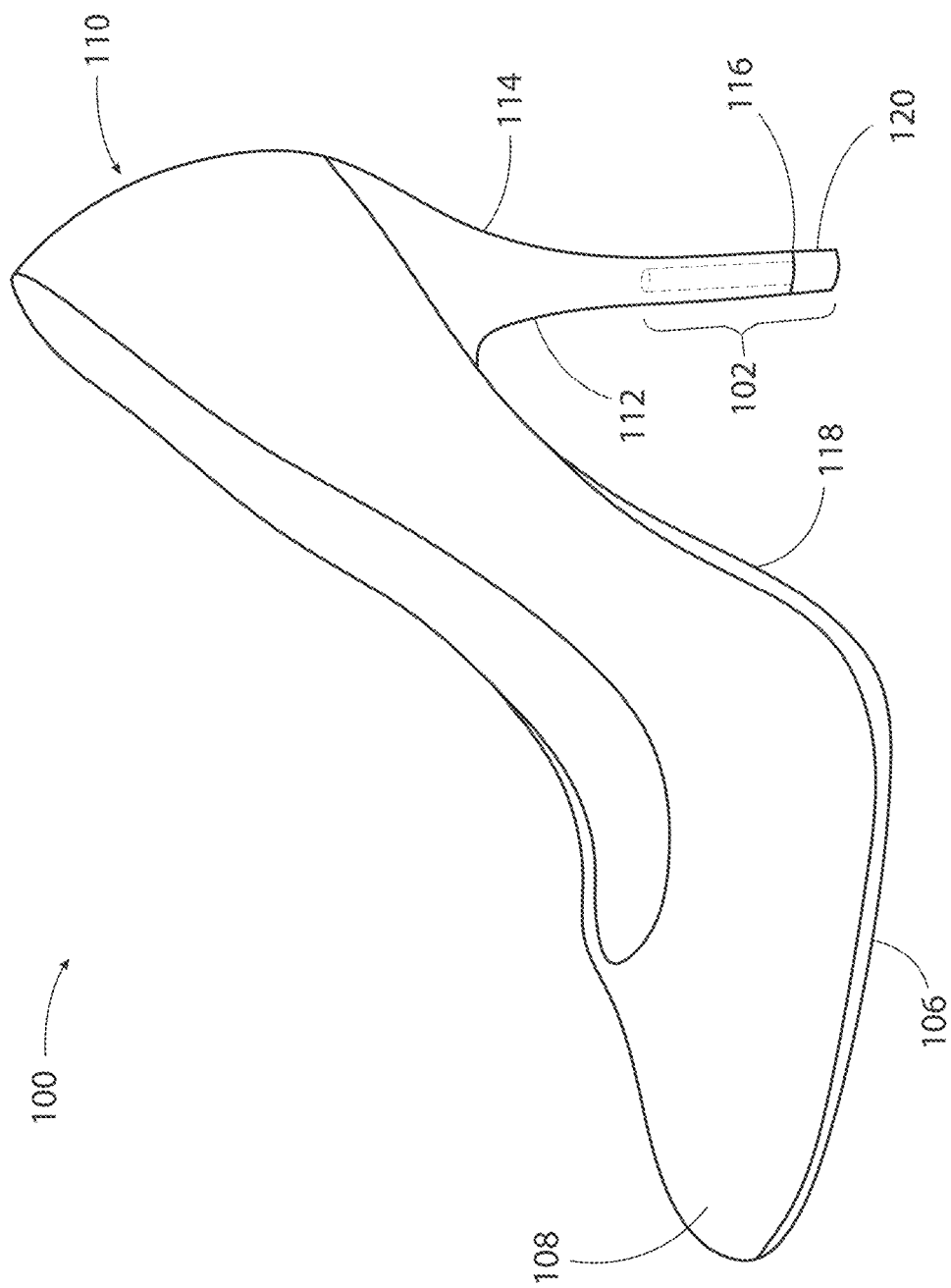
FIG. 1 is a perspective view of an example high heel footwear having a relatively narrow heel that incorporates a heel tip assembly according to an aspect of the present disclosure.

FIG. 1 is a perspective view of an example high heel footwear 100 having a relatively narrow heel that incorporates a heel tip assembly 102 according to an aspect of the present disclosure. The term "footwear" encompasses shoes, boots, sandals, flip flops, and any other apparatus worn on the foot and designed or intended to be worn by either men or women or both. The term "high heel" has its ordinary meaning to those skilled in the art of footwear, and those of ordinary skill in the art of footwear will appreciate the dimensions and characteristics of a footwear item having a high heel. For example, stiletto type heels can have a heel height of about 4-6 inches or even higher. Squatter, high heel boots (including those worn by men), for example, can have a heel height of about 3-4 inches. According to some aspects, a minimum heel height to qualify as a high heel is about 2 inches. The present disclosure also contemplates so-called platform footwear, so long as there is a distinct outsole portion and distinct heel portion. As shown in FIG. 1, the various parts of a high heel footwear 100 are conventionally labeled as an outsole 106, a toe box 108, a counter 110, a breast 112 of the heel, a heel 114, a seat 116, a shank 118, and a top lift 120. The top lift 120 can variously also be referred to as the top piece, the heel tip, the heel lift, or the heel cap, and these terms are used interchangeably herein. The width of the top lift 120 can vary, from narrow in the case of a stiletto heel, to relatively wide as used on a boot or a platform shoe, and aspects of the present disclosure can be used on any top lift 120, from narrow to wide.

For reading convenience, the same reference numbers are used throughout this disclosure to refer to the same item or feature even though they might appear in different embodiments. Where that item or feature differs, a different reference number or an apostrophe is used to indicate that the disclosure is describing a different item or feature. The terms used in this description have their ordinary meaning as understood by those skilled in the art of footwear, tire technology, and mechanical devices.

Figure 2:
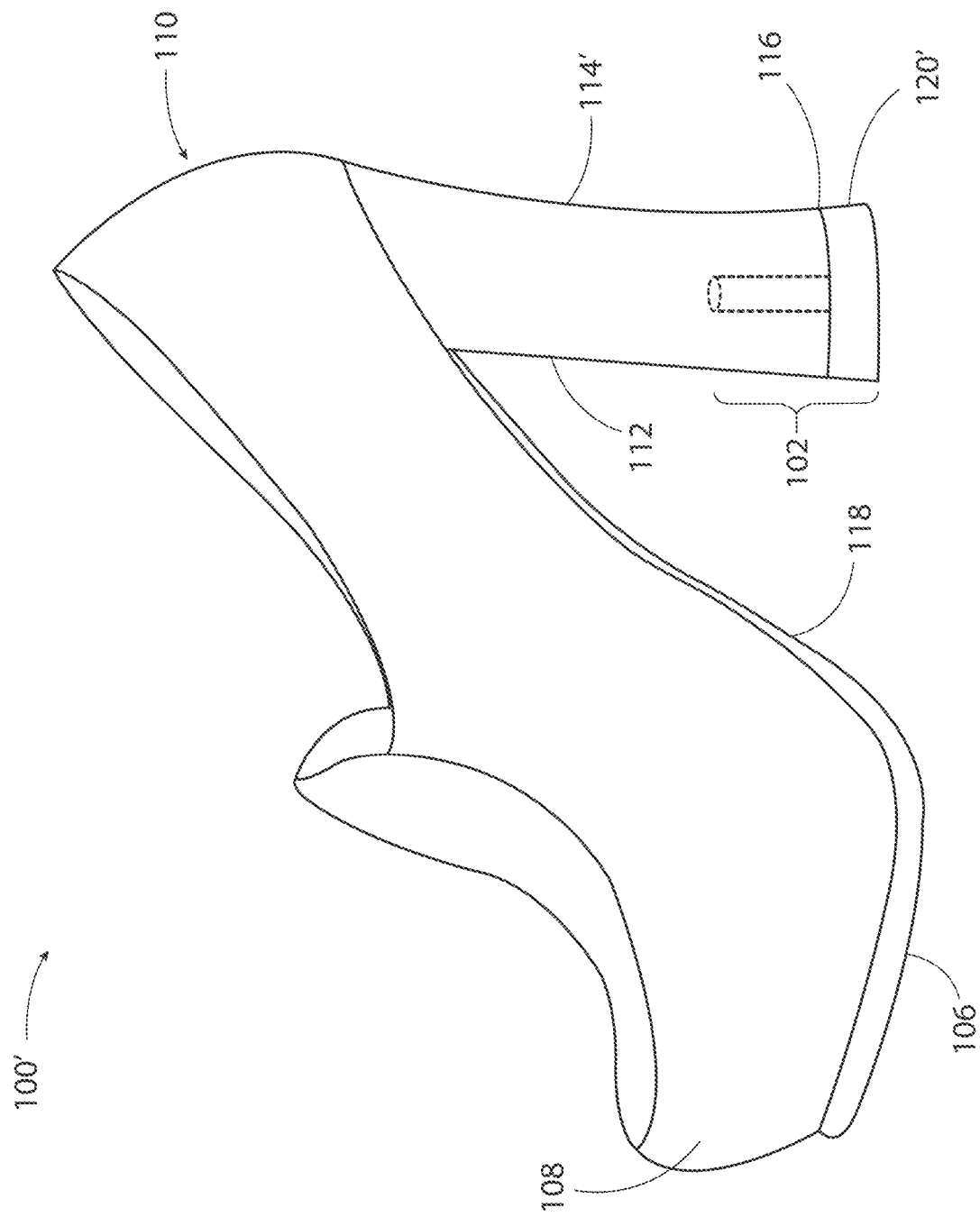
FIG. 2 is a perspective view of another example high heel footwear having a wider heel compared to the high heel footwear shown in FIG. 1, and which incorporates a heel tip assembly according to another aspect of the present disclosure.
Figure 14:
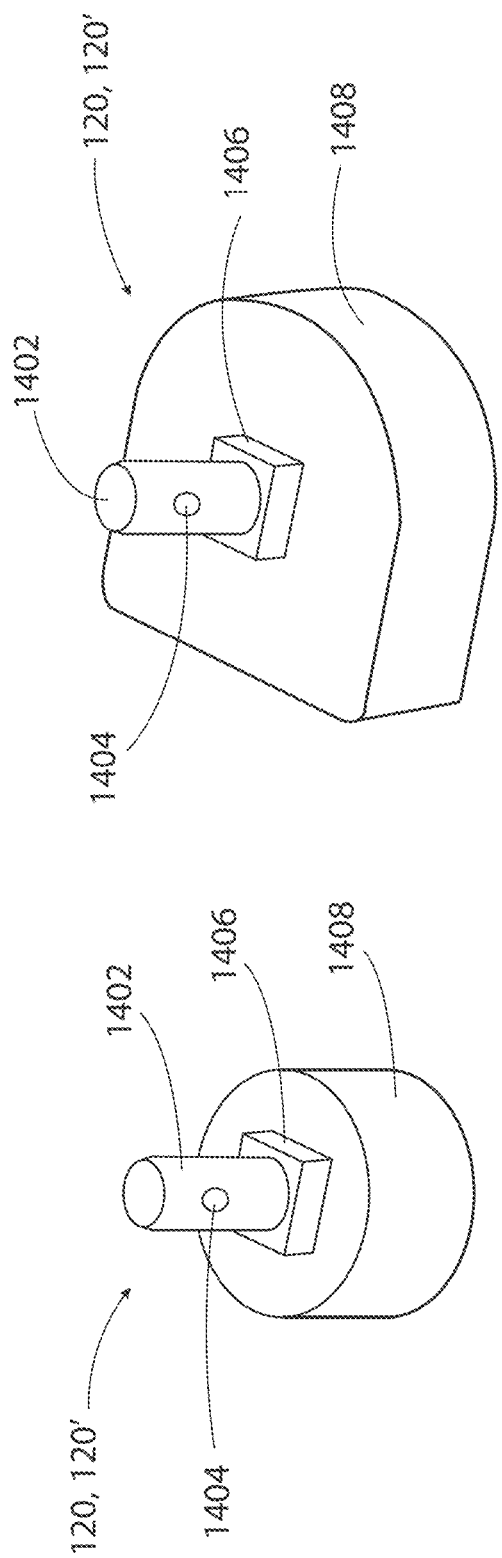
FIG. 14 shows two example isometric views of the top lift disclosed in connection with FIGS. 13A and 13B.

FIG. 2 is a perspective view of another example high heel footwear 100' having a wider heel 114' compared to the high heel footwear shown in FIG. 1, and which incorporates a heel tip assembly 102' according to another aspect of the present disclosure. The same reference numbers are used to refer to the same parts. The high heel footwear 100' has a thicker heel 114' compared to the heel 114 of the high heel footwear 100 shown in FIG. 1. The cross-section of the heel 114, 114' can be regular, such as circular such as shown in FIGS. 14 and 16A, or irregular such as shown in FIGS. 14 and 16B. Throughout this disclosure, for reading convenience, each heel tip assembly 102, 102' will be referred to with these reference numbers even though different embodiments may be described.

Figure 3B:
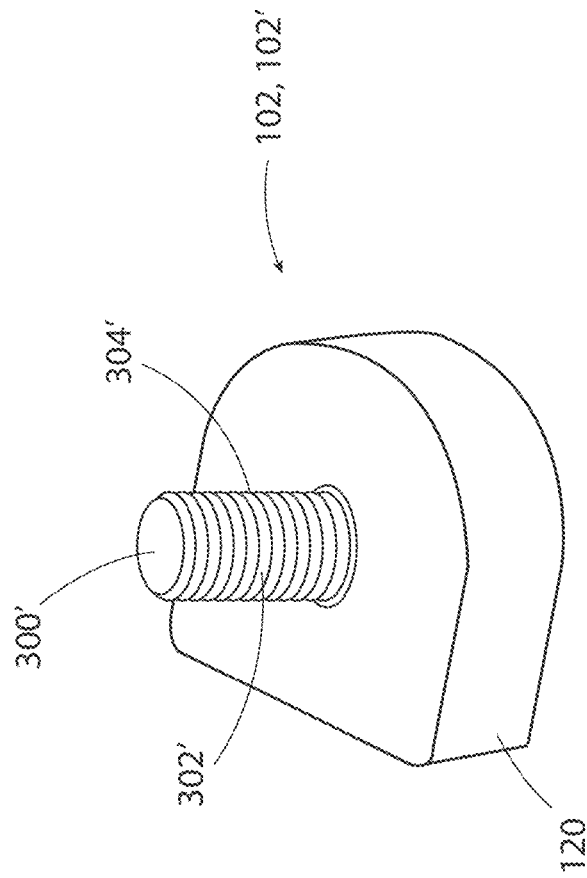
FIGS. 3A and 3B illustrate two different sized heel tip assemblies according to an aspect of the present disclosure.
Figure 3A:
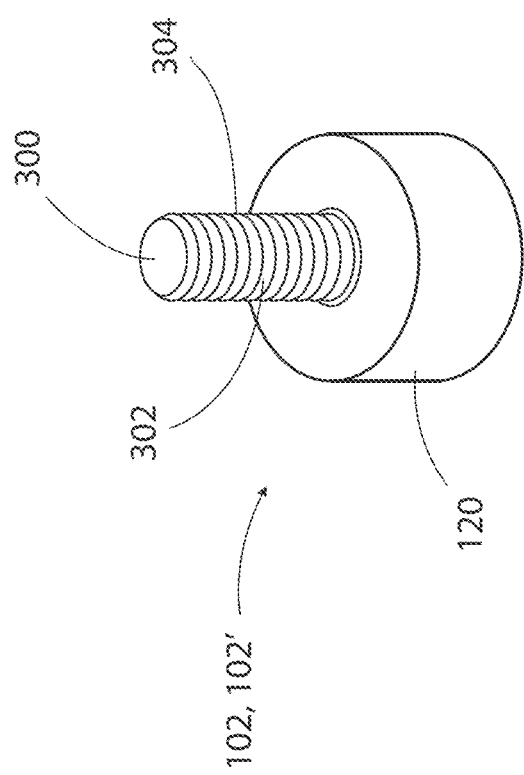

FIGS. 3A and 3B illustrate two different sized heel tip assemblies 102, 102' according to an aspect of the present disclosure. The heel tip assembly 102, 102' generally includes a securing feature part 300, 300', respectively. In this example, the securing feature takes the form of threads 302. Generally, a securing feature refers to a feature, such as a tangible feature, that permanently or removably secures one part to another in a manner that inhibits movement (by rotation, twisting, or otherwise) of the two parts relative to each other. The securing feature part 302, 302' also has a shaft portion those threads 302, 302' are threaded by rotation into a corresponding threaded insert inside the heel 114, 114' as described herein. In FIG. 3B, the top lift 120' of the heel tip assembly 102' has an irregular contour to match the contour of the heel 114' to which the top lift 120' is secured. As described here, an alignment feature can also be present to ensure that the contours of the top lift and the heel co-align. As the top lift 120' is screwed into place, depending on the alignment of the threads, the top lift 120' may have a tendency to stop rotating at a point where its outer contour is misaligned relative to the heel 114'. To avoid this scenario, various aspects of the present disclosure describe alignment features that aid in co-aligning the top lift with the heel in a facile way during assembly or construction of the footwear 100, 100'.

Figure 4B:
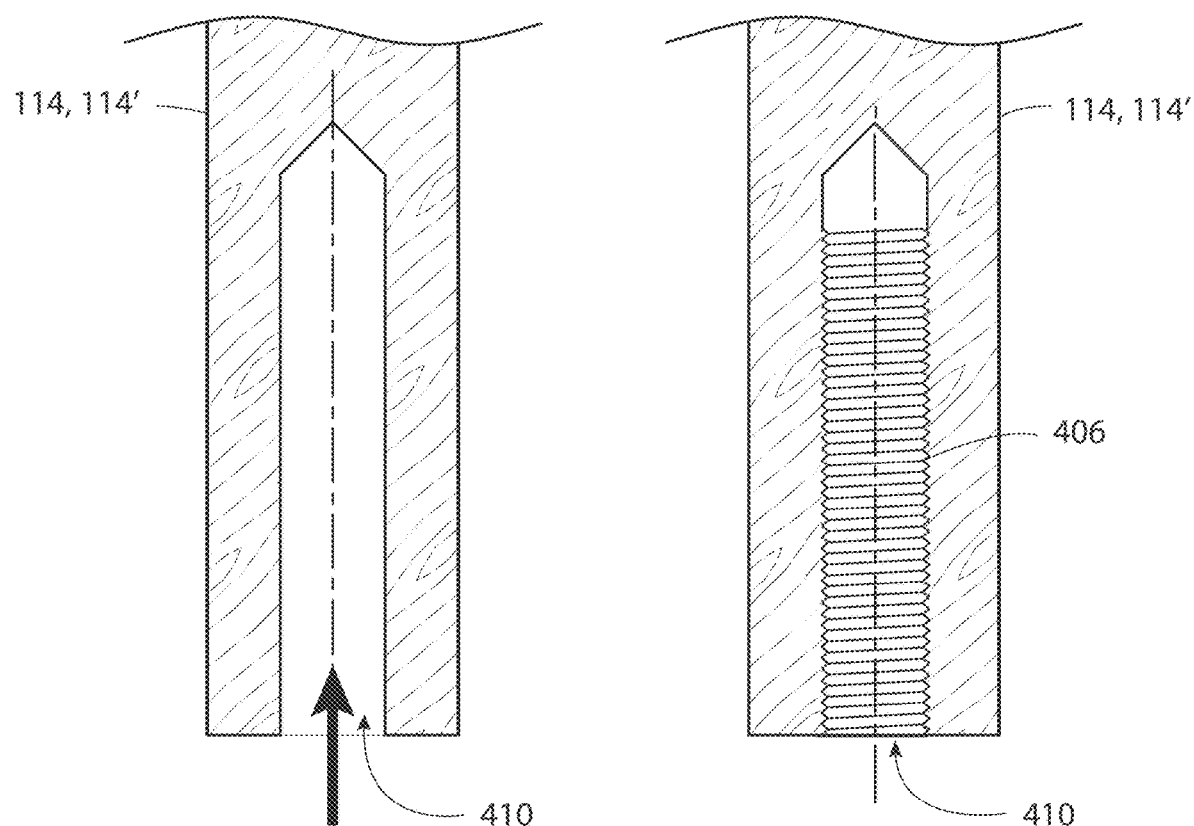
FIG. 4B illustrates an example threaded hole or bore formed within or tapped into the heel with threads to receive threads of a top lift according to aspects of the present disclosure.
Figure 4A:
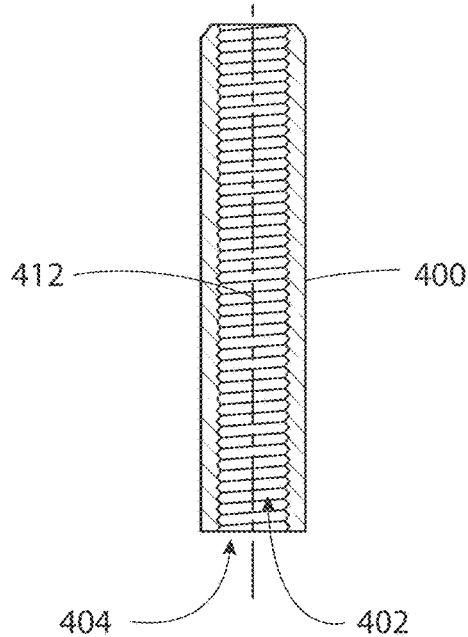
FIG. 4A illustrates an exemplary elongated threaded insert having a hole or bore through the center of a threaded insert, which is inserted into a heel according to aspects of the present disclosure.

Turning now to the heel side of the footwear, FIG. 4A illustrates an exemplary elongated threaded insert 400 having a hole or bore 402 through the center of a threaded insert 400, which is inserted through a hole or bore 410 of the heel 114, 114'. The threaded insert 400 is inserted into the hole or bore 410 of the heel 114, 114' so that an end opening 404 of the threaded insert 400 can receive the securing feature part 300, 300' of a heel tip assembly 102, 102'. The threaded insert 400 can be secured to the heel 114, 114' by glue or interference fit, for example. Alternately, in FIG. 4B, a threaded hole or bore 410 is formed within or tapped into the heel 114, 114' with threads 406 that are configured to receive the threads 302 of the securing feature part 300, 300'.

Figure 5A:
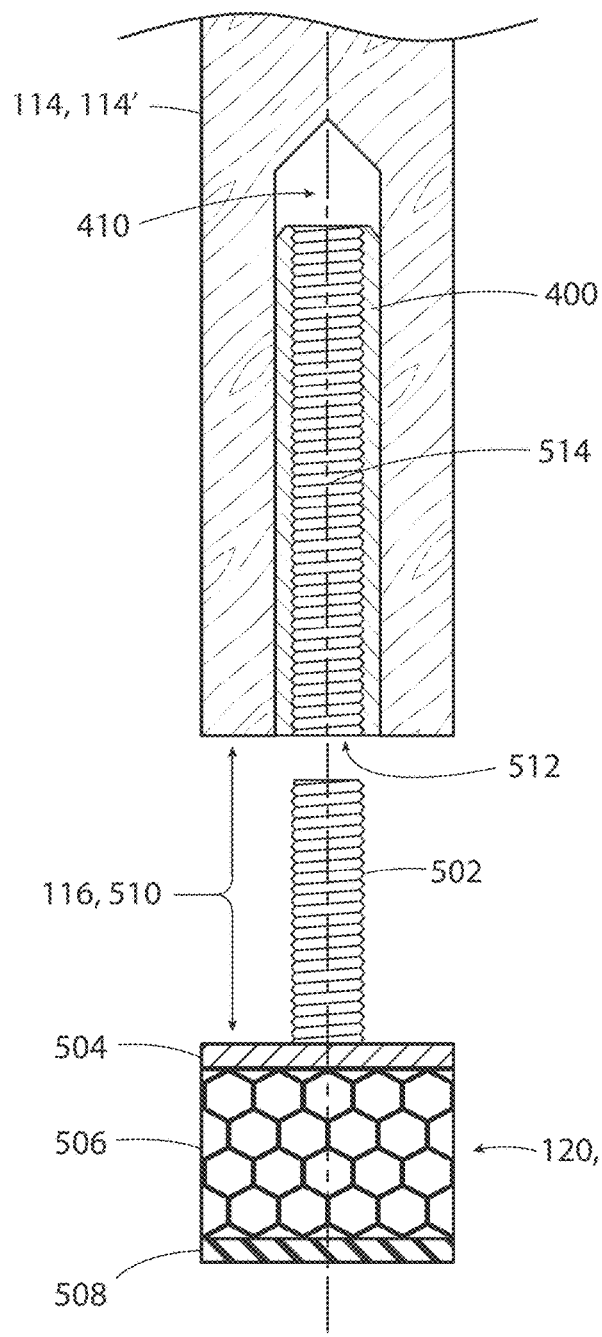
FIGS. 5A and 5B illustrate two example implementations of a heel tip assembly having a top lift with a honeycomb or micro honeycomb pattern made from tire material.
Figure 5B:
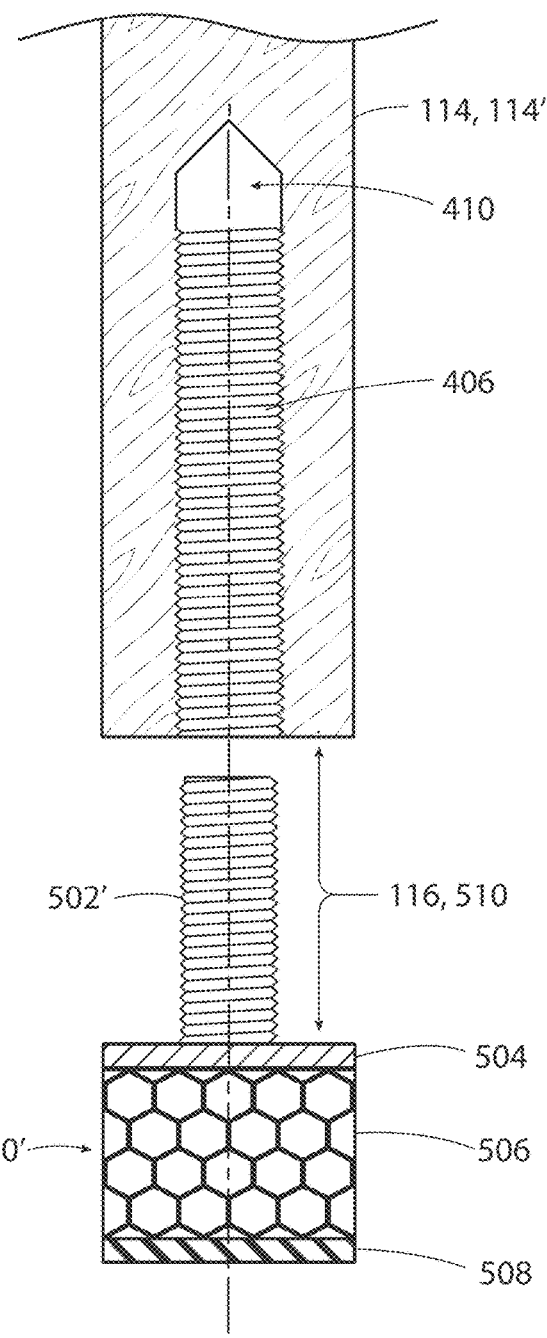

FIGS. 5A and 5B illustrate two example implementations of a heel tip assembly 102, 102' having a top lift 120, 120' with a honeycomb or micro honeycomb pattern made from tire material, including a rubber compound and fillers such as fiber or textiles. Any of the honeycomb or micro honeycomb patterns or structures disclosed herein can be printed by a 3D printing technique, such as digital light synthesis. The top lift 120, 120' has a base portion 504, a central portion 506, and a top portion 508. The cross-section of the central portion 506 has a honeycomb pattern. The illustrations are not schematic representations of the actual honeycomb pattern. Indeed, the honeycomb pattern is shown for ease of illustration so that the reader can readily see the pattern; however, the size of the honeycombs can vary from the size actually shown. For example, the honeycombs can be made larger, or the walls of the honeycomb can be thicker. The honeycomb pattern allows the top lift 120, 120' to compress or deform slightly under load, and more so than if the top lift 120, 120' were made from a solid material such as rubber. The honeycombs of the pattern are arranged to so as to compress along a vertical direction when a load is presented at the top of the honeycomb, thereby providing a cushioning effect to the wearer of the high heel footwear. The top portion 508 (i.e., the part that contacts the ground surface) can be a tire tread material or composed of solid rubber having a tread-like pattern facing the ground to enhance the grip and friction coefficient relative to the ground surface. The base portion 504 can be composed of, for example, metal, such as the same metal as a threaded shaft 502 that extends away from the base portion 504, and the central portion 506 can be secured or attached permanently to the base portion 504 by an adhesive or any other conventional process to permanently affix the two different interface materials together. Another interface 510 is present between the exposed surface of the base portion 504 and the exposed surface of the bottom of the heel 114, 114' before the top lift 120, 120' is secured to the heel 114, 114'. At this interface, an adhesive or other method of permanently affixing the base portion 504 to the bottom of the heel 114, 114' can be used after the securing feature in the form of a threaded shaft 502, 502' is screwed into the corresponding threaded insert 400 or threads 406 inside the bore 410 of the heel 114, 114'. As the wearer walks with the heel top assembly 102, 102' installed in the footwear 100, 100', the honeycomb structure of the central portion 506 will compress and bulge outwardly, providing a soft cushion for the wearer and absorb and dissipate shock waves emitted each time the top portion 508 contacts the ground surface.

Example dimensions of the top lift 120, 120' are as follows. The length, width, or diameter of the top lift 120, 120' match the corresponding length, width, or diameter of the heel 114, 114' to which the heel tip assembly 102, 102' is attached so that the outer contour of the heel at the interface 116 matches the outer contour of the top lift 120, 120'. Beyond the interface, the contour of the top lift 120, 120' can diverge from that of the heel 114, 114'. For example, the top lift 120, 120' can flare outwardly or taper inwardly starting from the interface 116 toward the top portion 508.

Figures 6A, 6B:
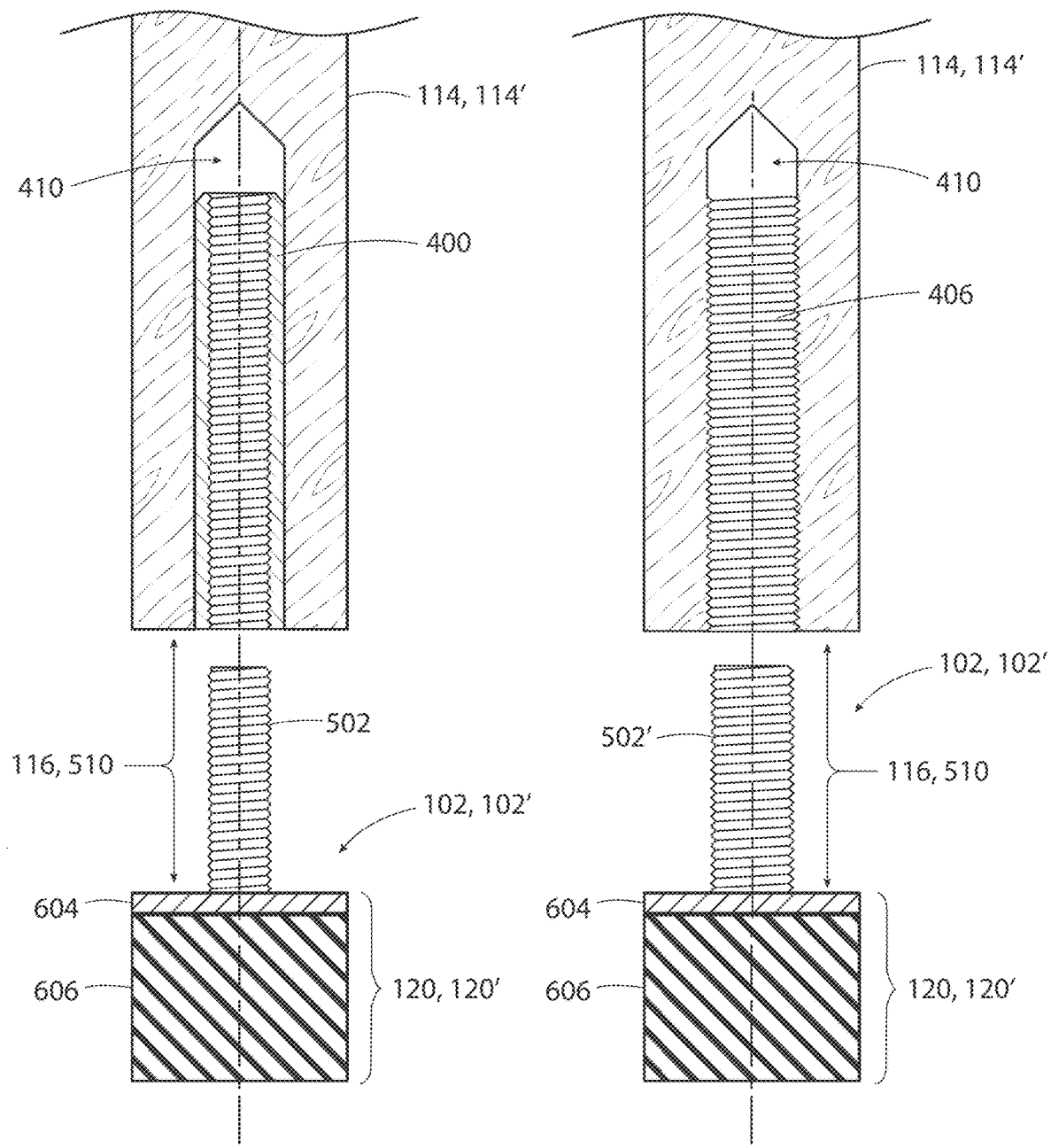
FIG. 6A illustrates a heel having a threaded shaft 502 threaded into a threaded insert that is secured into a hole or bore of a heel.
FIG. 6B illustrates a heel having a threaded shaft threaded into the threaded hole or bore that is tapped into the heel

FIGS. 6A and 6B illustrate two examples where the top lift 120, 120' has a top portion 606 made of a solid rubber material that is glued or otherwise permanently affixed to a base portion 604 of a heel tip assembly 102, 102'. The base portion 604 can be made of the same material as the threaded shaft 502, such as metal, to form an anti-rotation feature and a securing feature for the top lift 120, 120'. The outer contour of the base portion 604 and the top portion 606 matches the outer contour of the exposed end of the heel 114, 114' at the interface 116, 510 so that at the interface 116, 510, there is no perceptible discontinuity from the heel 114, 114' to the top lift 606. In FIG. 6A, the threaded shaft 502 is threaded into the threaded insert 400 that is secured into the hole or bore 410 of the heel 114, 114'. In FIG. 6B, the threaded shaft 502' is threaded into the threaded hole or bore 410 that is tapped into the heel 114, 114' with threads 406 that are configured to receive the threads of the threaded shaft 502', which provides a securing feature and an anti-rotation feature relative to the heel 114, 114'. This embodiment is particularly suited for thicker diameter heels, such as the heel 114' shown in FIG. 2.

Figures 7A, 7B:
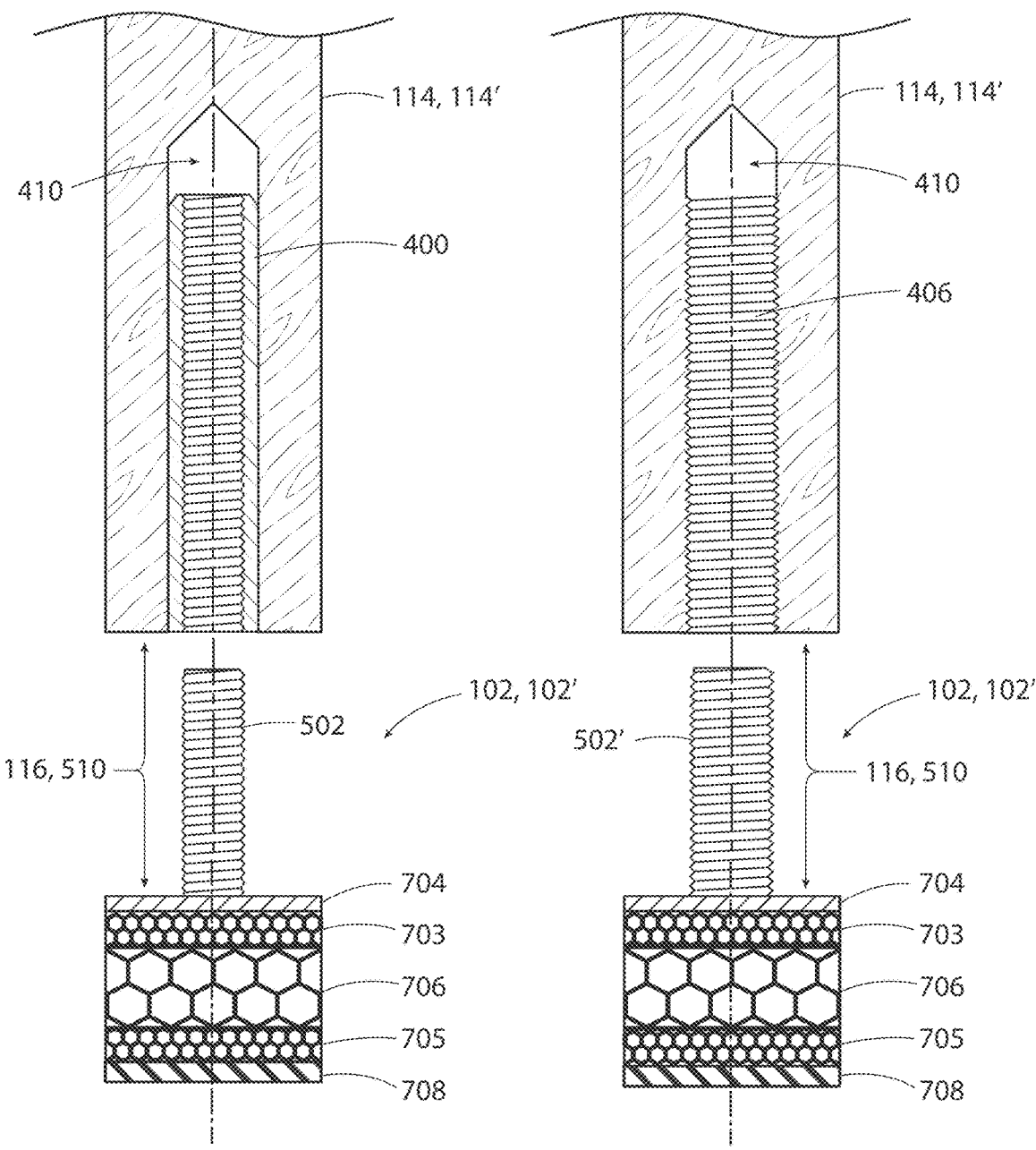
FIGS. 7A and 7B illustrate two examples of a heel tip assembly having a top lift including two types of honeycomb patterns.

FIGS. 7A and 7B illustrate two examples of a heel tip assembly 102, 102' having a top lift including two types of honeycomb patterns 703, 705, 706 such as shown as honeycomb pattern 506 in FIGS. 5A and 5B. The top lift has a central portion 706 made from a tire material and having a honeycomb pattern. On either side of the central portion 706, there are encapsulating portions 703, 705 also made from a tire material and having a denser honeycomb pattern compared to that of the central portion 706. Thus, the central portion 706 has more "give" under compression, whereas the denser surrounding encapsulating portions 703,705 have less give, thereby providing more cushioning against shocks and vibrations that would otherwise be transmitted up the leg of the wearer. The top portion 708 can be made of a tire tread material or composed of solid rubber having a tread-like pattern facing the ground to enhance the grip and friction coefficient relative to the ground surface and to provide a softer or quieter interface with the surface on which the footwear is traversing compared to conventional materials used for a high heel top. A base portion 704 fixed to the encapsulating portion 703 can be composed of, for example, metal, such as the same metal as a threaded shaft 502 that extends away from the base portion 704, and the encapsulating portion 703 can be secured or attached permanently to the base portion 704 by an adhesive or any other conventional process to permanently affix the two different interface materials together. The threaded shaft 502 is screwed into an elongated threaded insert 400 having a hole or bore 402 through the center of a threaded insert 400, which is inserted through a hole or bore 410 of the heel 114, 114', to form an anti-rotation feature and a securing feature. When fully screwed in place at the interface 116, 510, the outer contour of the top lift matches an outer contour of the heel 114, 114' at the interface 116, 510 so that no visual discontinuities can be perceived. The colors of the top lift and heel can also be matched to further the visual effect. The embodiment of FIG. 7B is identical except that the heel 114, 114' is wider and can accommodate a larger top lift and therefore more tire tread and honeycomb material.

The drawings shown herein are not necessarily shown to scale and some features may be exaggerated so that the various layers can be seen by the reader. The top lifts of the present disclosure can have the same dimensions as conventional top lifts used in high heel footwear.

Figure 8:
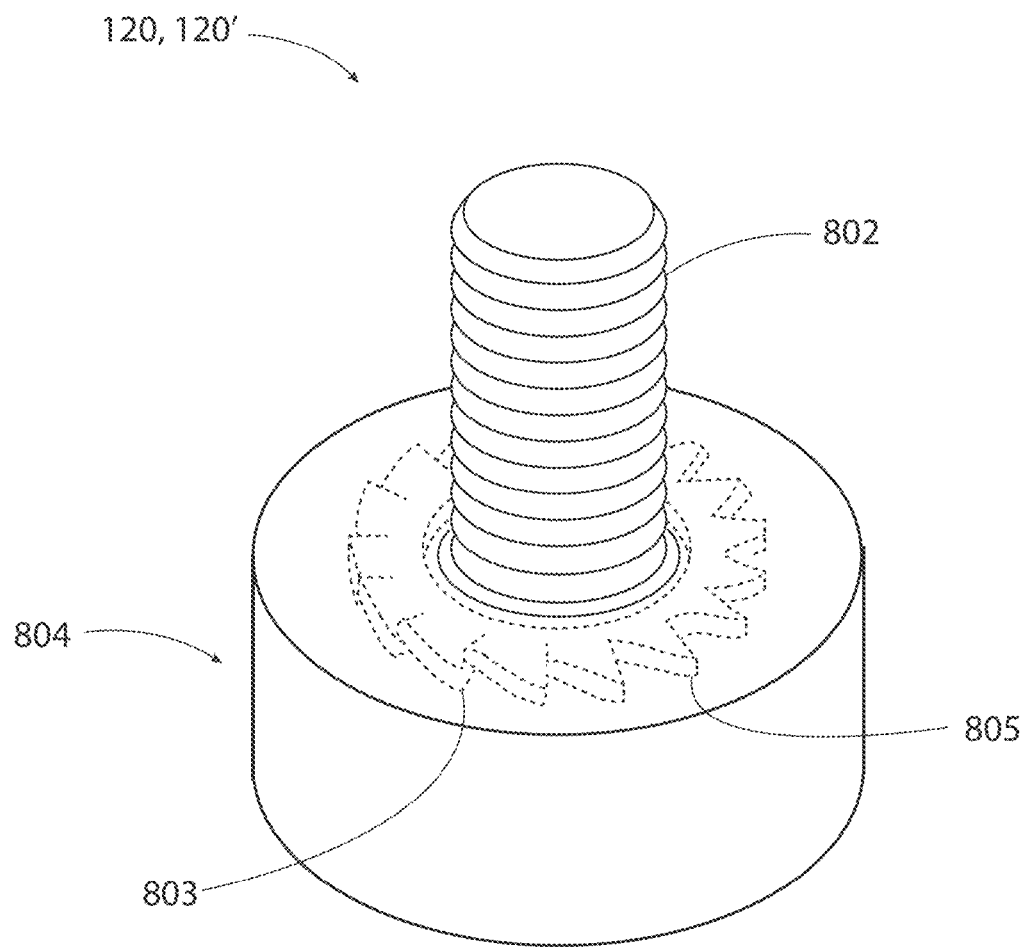
FIG. 8 is an example of another top lift having a base portion made of a solid tire tread material.

FIG. 8 is an example of another top lift 120, 120' that can be used with any heel 114, 114' disclosed herein. Here, a base portion 804 of the top lift shown in FIG. 8 can be made of a solid tire tread material, for example, or of a material that includes rubber. A threaded shaft 802 extends from the base portion 804 and includes a head 803 having teeth 805 around a diameter of the head which prevent the shaft 802 from rotating relative to the base portion 804 when the threaded shaft 802 is screwed into a corresponding threaded hole or bore in the heel 114, 114'. The teeth 805 provide an anti-rotation and a securing feature to prevent rotation of the base portion 804 and to secure it to the heel 114, 114'. The head 803 and teeth 805 are embedded within the base portion 804 so only the threaded shaft 802 can be seen emerging from the base portion 804.

Figure 9A:
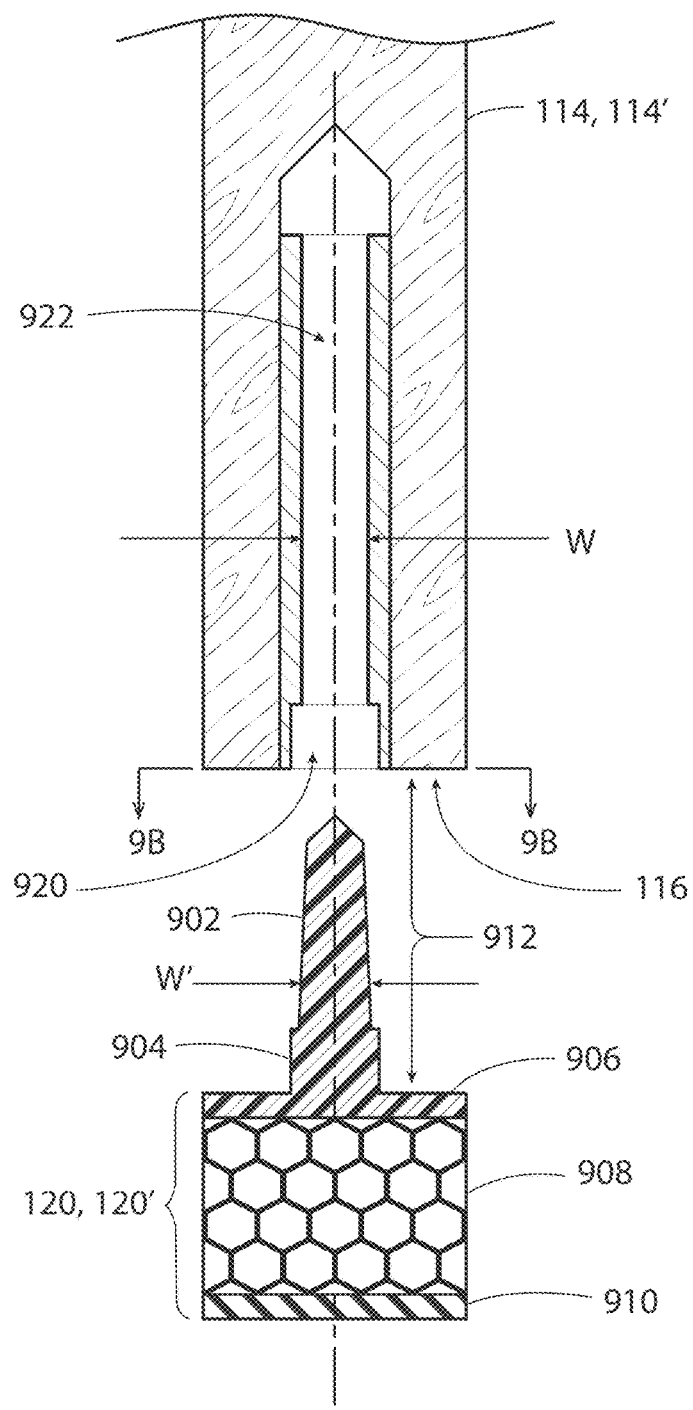
FIGS. 9A and 9B illustrate side and end views, respectively, of a top lift having rotation, securing, and alignment features.
Figure 9B:
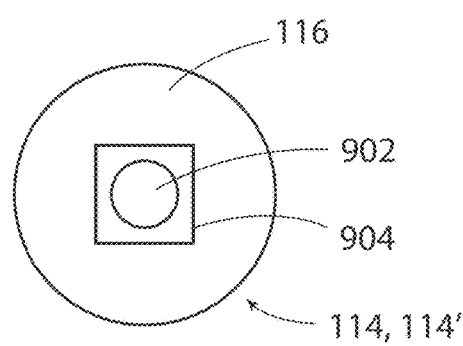

FIGS. 9A and 9B illustrate side and end views, respectively, of a top lift 120, 120' having rotation, securing, and alignment features. A base portion 904 forms an alignment feature, which can have a non-circular cross-section to co-align the base portion 904 relative to the heel 114, 114' so that the outer contours of the base portion 904 and the heel 114, 114' match. The base portion 904 also forms an anti-rotation feature, preventing the top lift 120, 120' from rotating once fully inserted into the heel 114, 114'. The top lift 120, 120' also includes a conical tapered portion 902 that tapers toward a seat or interface 116 of the heel 114, 114' as shown in FIG. 9A. The conical tapered portion 902 is inserted into a bore 922 through a hole 920 that has a corresponding section that receives the base portion 904 (seen in FIG. 9B), and has a width W that is slightly smaller than a width W' of the widest part of the conical tapered portion 902 to form an interference fit inside the bore 922 of the heel 114, 114'. The rest of the top lift 120, 120' can be like any of the top lifts disclosed herein; however, in the example of FIG. 9A, the top lift 120, 120' includes a central portion 908 having a honeycomb pattern made from tire material, including a rubber compound and fillers such as fiber or textiles. The cross-section of the central portion 908 has a honeycomb pattern. The top lift 120, 120' also includes a top portion 910 (i.e., the part that contacts the ground surface) composed of a tire tread material or of solid rubber having a tread-like pattern facing the ground to enhance the grip and friction coefficient relative to the ground surface. The base portion 906 can be composed of, for example, metal, such as the same metal as the conical tapered portion 902 as shown by the cross section in FIG. 9A. To insert the top lift 120, 120' into the bore 922, the top portion 910 can be tapped in, after aligning the non-circular base portion 904 with the hole 920 so that the (irregular) profiles of the heel and top lift match.

Figure 10A:
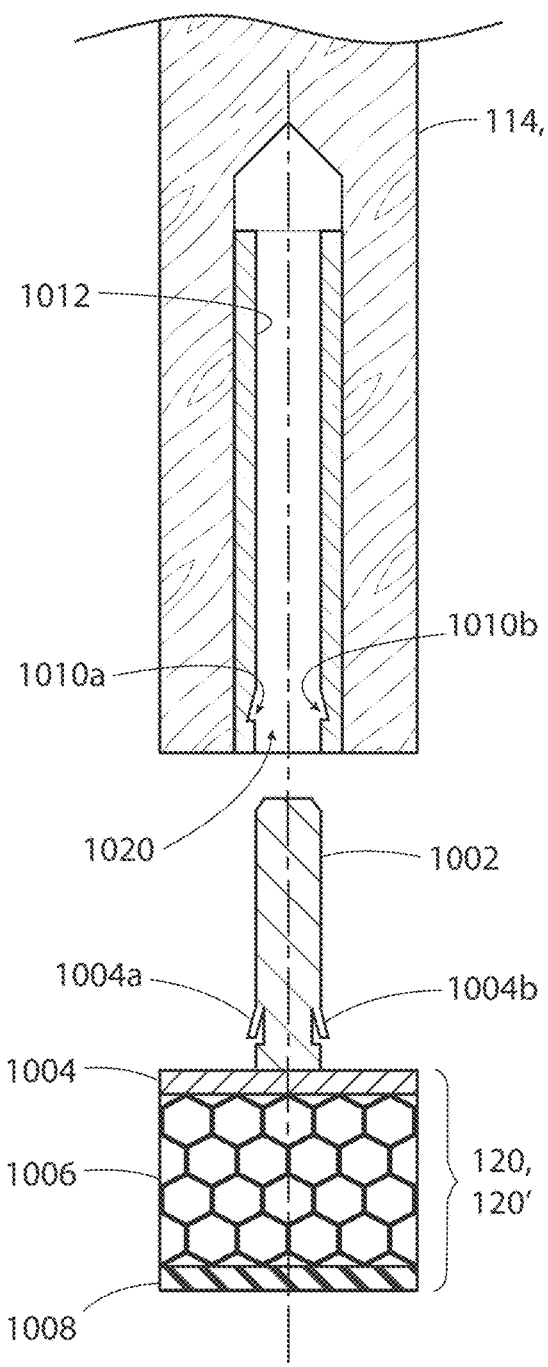
FIGS. 10A and 10B illustrate two additional implementations of a heel tip assembly according to the present disclosure, featuring a different anti-rotation and alignment feature than disclosed in connection with FIGS. 9A and 9B.
Figure 10B:
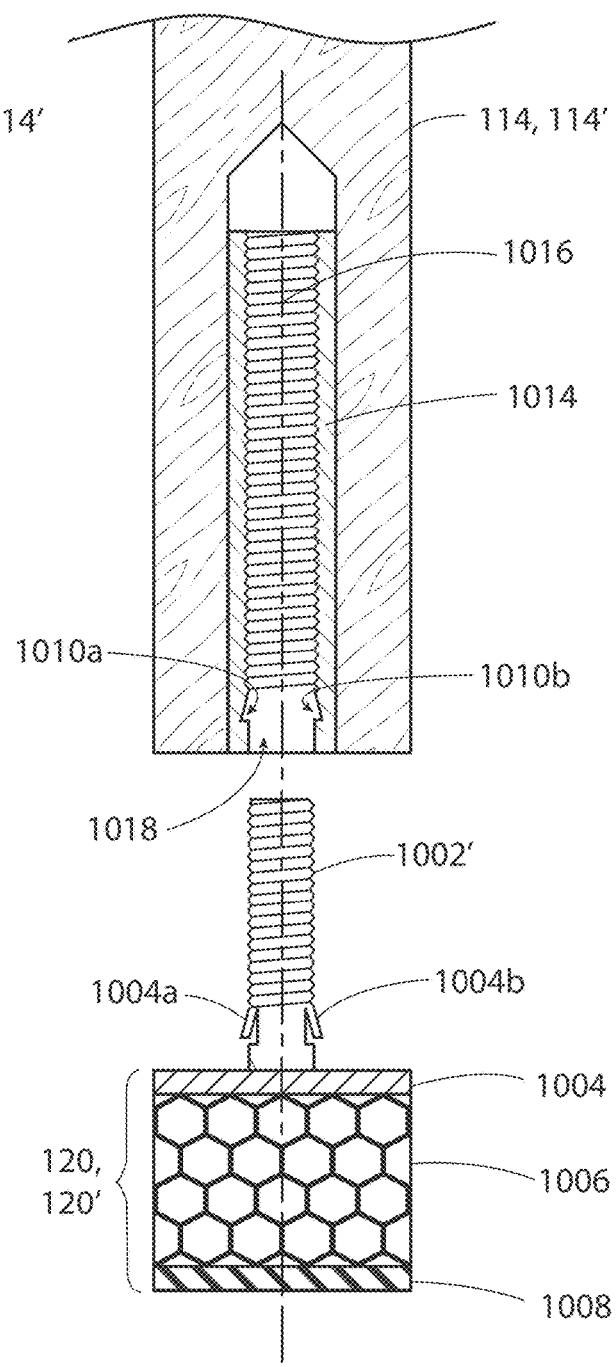

FIGS. 10A and 10B illustrate two additional implementations of a heel tip assembly according to the present disclosure, featuring a different anti-rotation and alignment feature than disclosed in connection with FIGS. 9A and 9B. Here, a shaft member 1002 of the top lift 120, 120' includes a first spring element 1004*a* and a second spring element 1004*b*, which each protrudes away from an elongated surface of the shaft member 1002. The spring elements 1004*a*, 1004*b* form a securing feature part and are biased away from the elongated surface of the shaft member 1002. A base portion 1004 of the top lift 120, 120' is attached to the shaft member 1002, or the base portion 1004 and the shaft member 1002 can be a unitary, integral piece.

The heel 114, 114' includes a hole 1020 and a non-threaded bore 1012 having a first detent 1010*a* and a second detent 1010*b* arranged to receive the spring elements 1004*a*, 1004*b*, respectively, when the shaft member 1002 is inserted into the bore 1012 through the hole 1020. Because the spring elements 1004*a*, 1004*b* are biased outwardly, they will initially be forced inwardly against the shaft member 1002 until they snap outwardly into place within the detents 1010*a*, 1010*b* to form a securing feature but also an anti-rotation and an alignment feature. The rest of the top lift 120, 120' in this example includes a central portion 1006 having a honeycomb pattern composed of a tire tread material, and a top portion 1008, which can be composed of a solid tire tread material or rubber.

In FIG. 10B, the shaft member 1002' is threaded, and the threaded insert 1014 includes a threaded portion 1016 with threads and a non-threaded portion near a hole 1018 through which the threaded shaft member 1002' is inserted. The threaded shaft member 1002' is rotated into the threads of the threaded portion 1016 until the spring elements 1004*a*, 1004*b* click into place within the detents 1010*a*, 1010*b* of the non-threaded portion, to secure the top lift 120, 120' to the heel 114, 114', prevent it from rotating, and co-aligning the two parts so that the respective outer contours match around their entire circumference.

Figure 11:
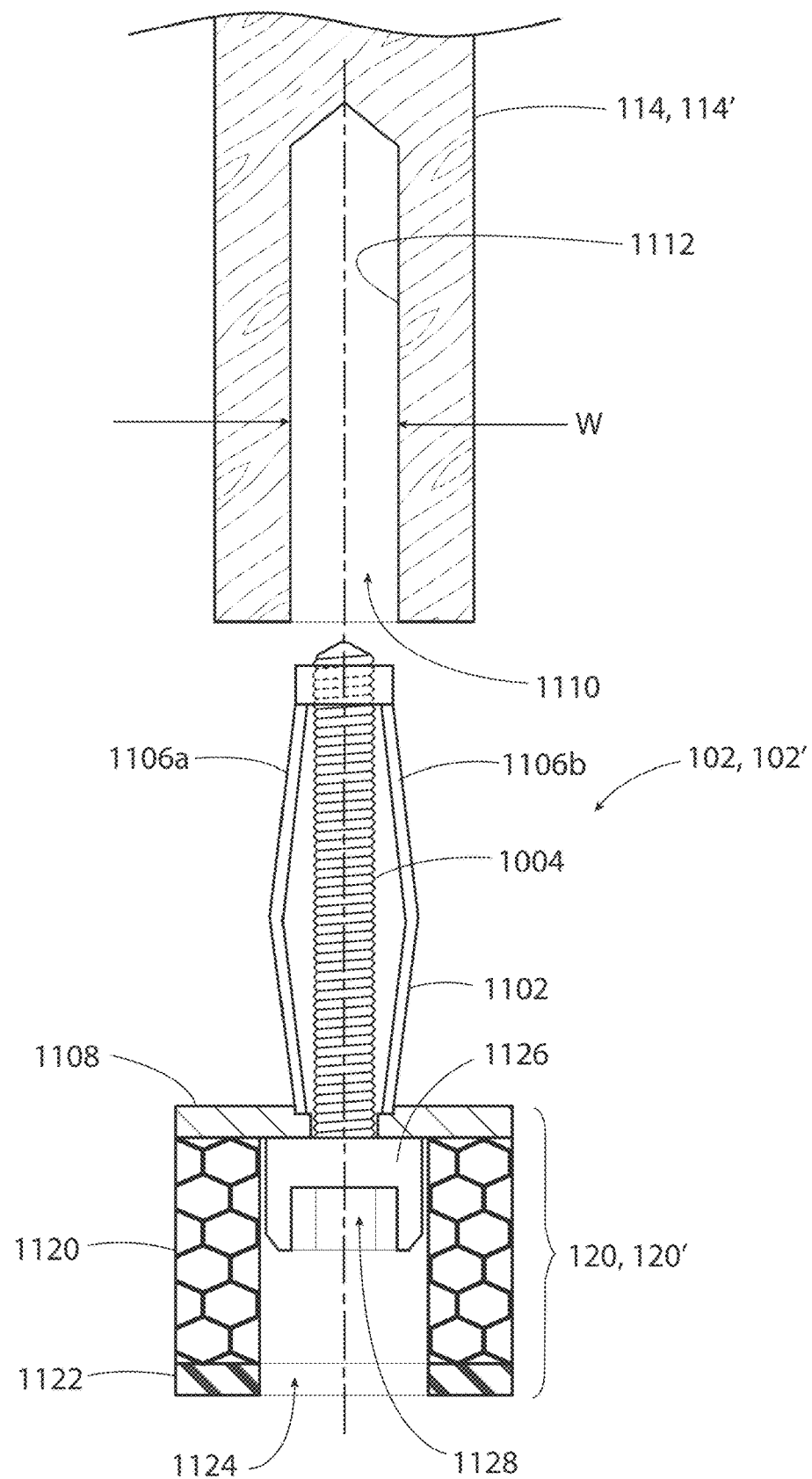
FIG. 11 illustrates a top lift having a screw-actuated anchor to secure the top lift within the heel of the top lift assembly.

FIG. 11 illustrates a top lift having a screw-actuated anchor to secure the top lift within the heel of the top lift assembly. The screw-actuated anchor 1102 includes a first arm 1106*a* and a second arm 1106*b* that flare outwardly from a shaft member 1004 having threads. A base portion 1108 can be made of metal and includes a hole through which the shaft member 1004 extends and terminates at a head 1126 having a tool receiving portion 1128 to receive a tool that rotates the screw-actuated anchor 1102 inserted into the hole 1110. After the screw-actuated anchor 1102 is fully inserted into the hole 1110 of the heel 114, 114', a tool is inserted into the tool receiving portion 1128 of the head 1126 and rotated in situ within the hole 1110, which rotation causes the arms 1106*a,b* to begin to extend outwardly toward the inner surface 1112 of the hole 1110 of the heel 114, 114' until the arms 1106*a,b* press expand the width W of the hole 1110 to provide an anti-rotation feature, which prevents the top lift 120, 120' from rotating or becoming mis-aligned during usage of the high heel footwear. The top lift portion 120, 120' includes a hole 1124 so that a tool can be received in the tool receiving portion 1128. This hole can be plugged after installation with a material to match that of the top lift portion 120, 120', such as a tire tread material. The top portion 1122 can be made of a tire tread material. An insert made from the same tire tread material can be used to plug the hole 1124. The central portion 1120 can have a honeycomb pattern to provide cushioning as discussed above. The arms 1106*a,b* allow minute adjustments of the top lift portion 120, 120' within the heel 114, 114' to co-align the two parts perfectly while the final position is determined by forcing the arms 1106*a,b* apart as much as the material of the heel 114, 114' will allow without damage.

Figures 12A, 12B:
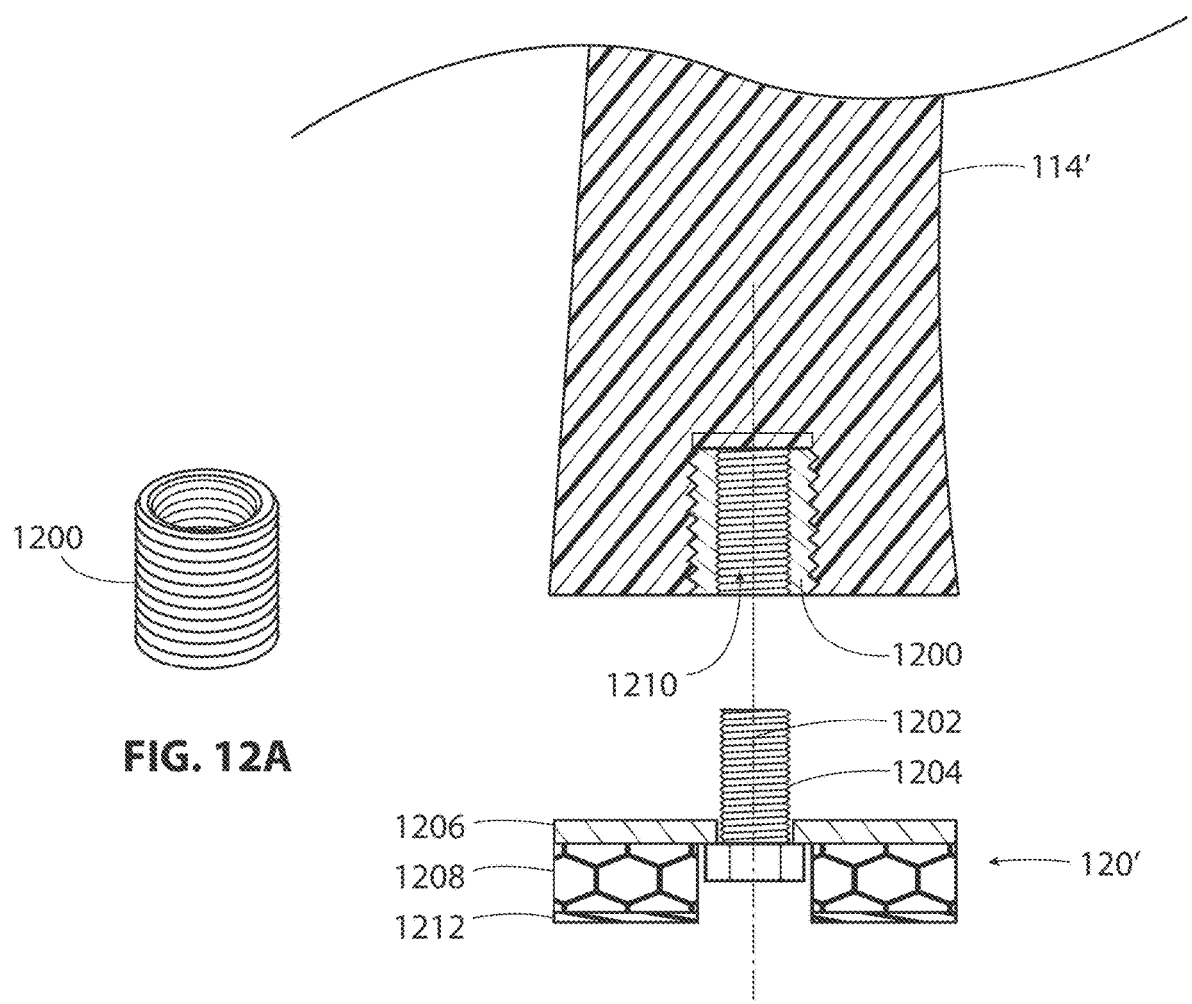
FIGS. 12A and 12B illustrate another way of securing a top lift to a heel of a wider heel, such as shown in FIG. 2.

FIGS. 12A and 12B illustrate another way of securing a top lift 120' to a heel 114' of a wider heel, such as shown in FIG. 2. A hollow, self-tapping insert 1200 (shown in FIG. 12A) is screwed into a base of the heel 114', which can be composed of plastic on its interior, making it suitable for receiving a self-tapping insert. The top lift 120' includes a base portion 1206, which can be composed of a metal material, a central portion 1208 having a honeycomb pattern and composed of a tire tread material, and a top portion 1212, which can be composed of a tire tread material having a tread pattern facing the ground. A shaft member 1202 having threads 1204 can be made of metal and is threadably received within the self-tapping insert 1200 installed in the heel 114', thereby providing an anti-rotation and securing feature for the top lift assembly.

FIGS. 13A and 13B illustrate yet another way of securing any top lift into any heel disclosed herein using springs inside the heel. The top lift 120, 120' includes a shaft member 1302 having a first receptacle 1304*a* and a second receptacle 1304*b* formed along a curved surface 1305 of the shaft member 1302 and a non-circular base portion 1306 that forms an alignment and anti-rotation feature for the top lift 120, 120'. The heel 114, 114' includes an insert assembly 1320 having a hole 1330 that narrows to a narrow portion 1322. The insert assembly 1320 includes a first spring 1328*a* and a second spring 1328*b* and a balls 1340*a*, 1340*b* that protrude from corresponding openings 1326*a,b* extending through a wall 1324 of the insert assembly 1320. The balls 1340*a,b* extend into the opening 1330 of the insert assembly 1320 until the shaft member 1302 is inserted through the opening 1330. When the balls 1340*a,b* align with the receptacles 1304*a,b* of the shaft member 1302, the springs 1328*a,b* allow the balls 1340*a,b* to compress the springs 1328*a,b* like a plunger element as the shaft member 1302 is inserted into the narrow portion 1322 of the insert assembly 1320 until the receptacles 1304*a,b* receive the balls 1340*a,b* and secure the top lift 120, 120' relative to the heel 114, 114'. The non-circular base portion 1306 (e.g., square) fits into the non-circular opening 1330 (e.g., square) to maintain an alignment of the top lift 120, 120', which can have a non-regular outer contour, relative to the heel 114, 114' (shown in FIG. 13B).

FIG. 14 shows two example isometric views of the top lift 120, 120' disclosed in connection with FIGS. 13A and 13B. One of the examples has a regular profile (circular), whereas the other has a non-regular or irregular profile. A round shaft 1402 has detents 1404 to be received in corresponding ball bearings inside the heel 114, 114' as disclosed in connection with FIGS. 13A and 13B. A base 1406 has a square shape and can be made of metal along with the round shaft 1402. The top portion 1408 can include a honeycomb pattern composed of a tire tread material as disclosed above. The square base 1406 permits alignment of the top lift 120, 120' relative to a heel 114, 114' having a non-regular outer contour.

Figure 15:
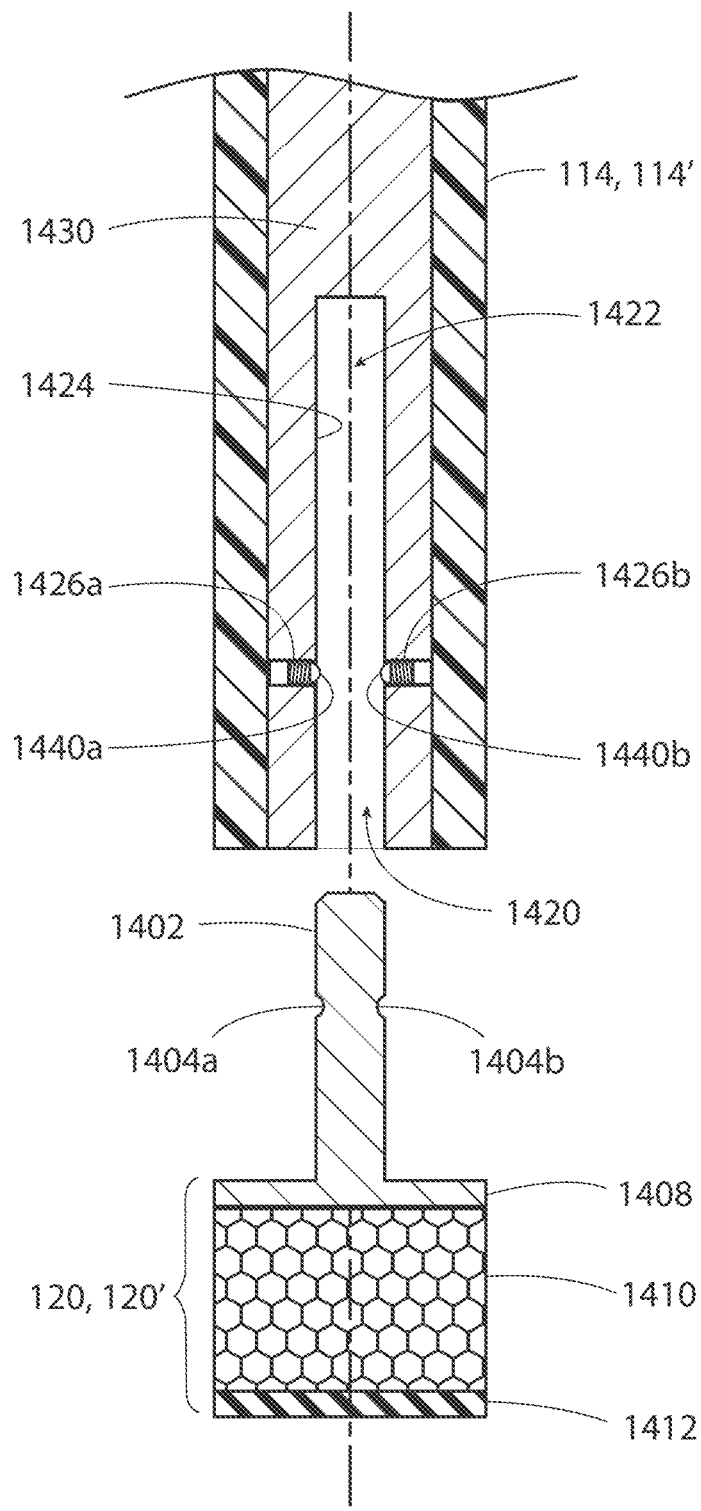
FIG. 15 illustrates another example where a heel includes ball bearings to receive corresponding detents formed in a shaft of a top lift but lacks a square base feature.

FIG. 15 illustrates another example where a heel includes ball bearings to receive corresponding detents formed in a shaft of a top lift but lacks a square base feature. The same reference numbers are used, except that the top lift 120, 120' lacks the base 1406 shown in FIGS. 13A and 13B. This implementation is suitable, for example, for a round heel 114, 114'.

Figure 16:
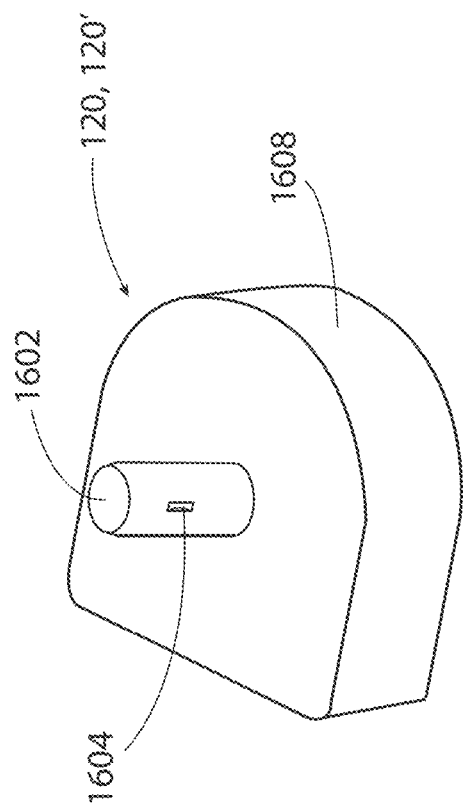
FIG. 16 illustrates two exemplary regularly and non-regularly shaped top lifts having shafts with slots to lock into corresponding features in the heel.
Figure 16:
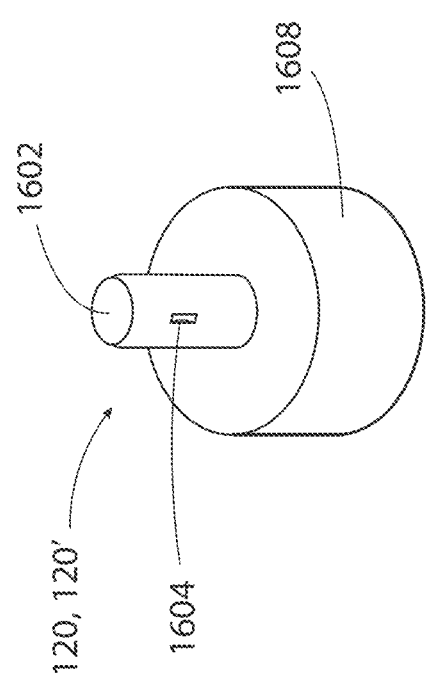

FIG. 16 illustrates two exemplary regularly and non-regularly shaped top lifts 120, 120' having shafts 1602 with slots 1604 to lock into corresponding features in the heel 114, 114' as disclosed above.

FIGS. 17A and 17B illustrate how the top lift 120, 120' can be slightly longer than the outsole of the high heel footwear 100, 100' when no load is present in the footwear 100, 100'. In FIG. 17A, the top lift 120, 120' extends below the outsole by a distance, d, to provide a total distance from the base to top of the top lift corresponding to a distance D. However, under compression by a load 1700, the top lift 120, 120' as shown in FIG. 17B compresses to reduce the overall distance, D'<D, so that the top lift 120, 120' is aligned on a horizontal plane 1702 with the outsole of the high heel footwear 100, 100'. Because the top lift 120, 120' can compress, such as due to the honeycomb tire tread material, designing the top lift 120, 120' so that it is slightly longer under no compression allows the compression to keep the footwear level under compression.

Figure 18:
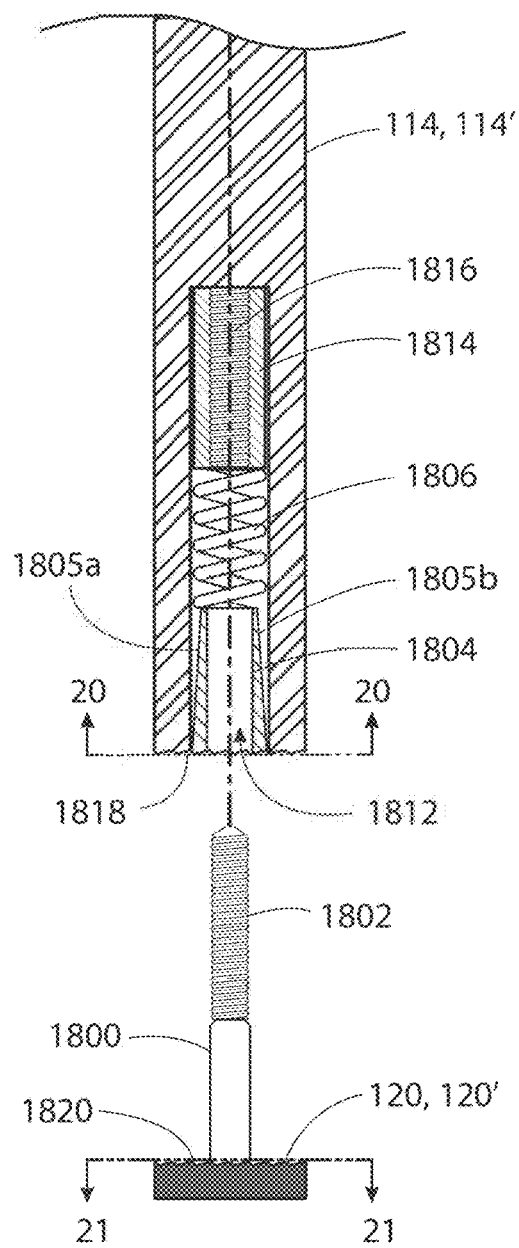
FIG. 18 illustrates a heel tip assembly having a threaded insert that is held in tension inside the heel by a spring.

FIG. 18 illustrates an exploded view of a heel 114, 114' (shown in cross section) and a heel tip assembly 102, 102' having a top lift 120, 120', and a rigid shaft 1800 (e.g., made of metal) having a threaded portion 1802 that screws into a threaded bung or insert 1814 that is inserted into a bore (such as formed by drilling) or opening (such as formed by 3D printing or other additive manufacturing process) 1812 formed in the heel 114, 114'. As shown in FIG. 18, the threaded portion 1802 of the (at least partially) rigid shaft 1800 is inserted into the opening 1812 through a hollow cone-shaped insert 1804, through a central axis of a coil or helical spring 1806, and then rotated so that the threads of the threaded portion 1802 threadably engage corresponding threads 1816 in the threaded insert 1814 to secure the top lift 120, 120' against the heel 114, 114'. As the threaded portion 1802 is rotated to threadably secure it to the threads 1816 of the threaded insert 1814, the spring 1806 begins to compress, thereby pulling the threaded insert 1814 in a lateral direction inside the opening 1812 toward the top lift 120, 120' in a direction D, shown in FIG. 19. The threaded portion 1802 is threaded toward the distal or top end of the rigid shaft 1800, and as shown in FIG. 18, the bottom part of the rigid shaft 1800 does not need to be threaded.

Figure 19:
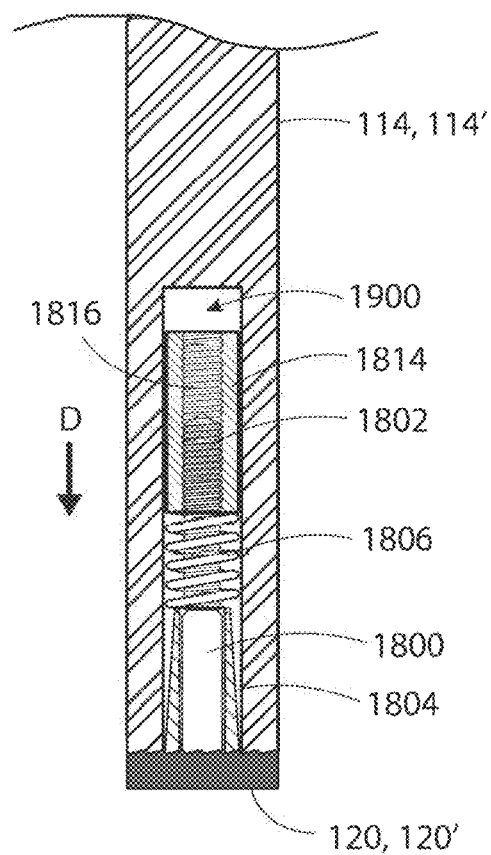
FIG. 19 illustrates the heel tip assembly of FIG. 18 with the threaded insert fully screwed into the heel and held against it by the spring.

As the threaded insert 1814 is pulled in the direction D shown in FIG. 19, a space 1900 is created above the threaded insert 1814. The insert 1804 is fixed or anchored relative to the heel 114, 114' and does not move laterally or rotationally relative to the heel 114, 114'. Any means of fixing the insert 1804 is contemplated. For example, the insert 1804 can have a cone shape with tapered sides 1805a, 1805b such that the widest end (d2 shown in FIG. 19) of the cone is slightly wider than a diameter of the opening 1812 (d1). The insert 1804 can be tapped into the bore 1812, such as with a hammer, until it is seated and flush with the top of the heel 114, 114'. In this manner, the insert 1804 has a press-fit or interference-fit interface with the inside of the bore 1812. Optional adhesive can be applied along the tapered sides 1805a,b of the insert 1804 to further anchor the insert 1804 inside the bore 1812 in the position shown in FIG. 18. The insert 1804 is inserted last into the bore 1812 after the threaded insert 1814 and the spring 1806 have been installed inside the bore 1812.

Because the insert 1804 is anchored inside the bore 1812, as the threaded portion 1802 of the rigid shaft 1800 is screwed into the threaded insert 1814, the coil or helical spring 1806 will compress, causing the threaded insert 1814 to move in a translational, but not rotational, direction D along the bore 1812 toward the top lift 120, 120'. This prevents the threaded insert 1814 from rotating as the threaded portion 1802 is screwed into the threaded insert 1814, the overall width of the threaded insert 1814 can be made slightly larger than a diameter of the bore 1812 (d1) so that the threaded insert 1814 forms an interference or press-fit interface with the inside of the bore 1812. Alternately or additionally, one or more wings or flanges can be provided on the outer circumference of the threaded insert 1814, such that when the threaded insert 1814 is forcibly inserted into the bore 1812, such as by hammering or tapping the threaded insert 1814, the wings or flanges bite into the inner sides of the heel 114, 114', which is typically made of plastic, forging a channel along the side of the bore 1812 along which the threaded insert 1814 can slide up and down in a lateral direction D but cannot rotate about its central axis as the threaded shaft 1802 is screwed into the threaded insert 1814.

Figure 20:
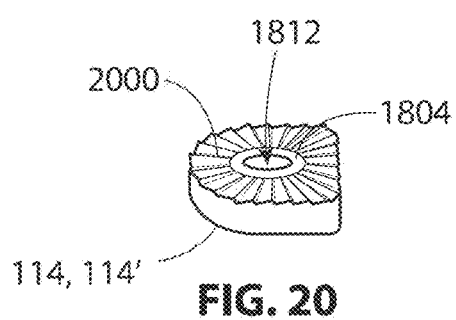
FIG. 20 is a top view of the heel taken along line 20-20 shown in FIG. 18.
Figure 21:
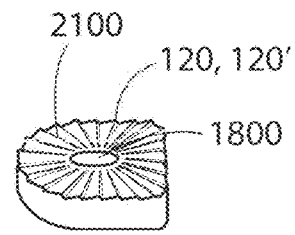
FIG. 21 is a bottom view of the top lift taken along line 21-21 shown in FIG. 18.

The threaded shaft 1802 together with the threaded insert 1814 form a securing feature to align the top lift 120, 120' relative to the top of the heel 114, 114' once installed therein. Alignment and anti-rotation features are shown in FIGS. 20 and 21, which show respective wedge-lock features or patterns 2000, 2100, which can be made of metal. The wedge-lock feature or pattern 2000 can be machined on the top 1818 of the heel 114, 114', or attached to the exposed end of the top 1818 of the heel 114, 114' as, for example, a metal (or hard plastic or other rigid material) washer having the wedge-lock pattern 2000. The wedge-lock pattern 2000 corresponds to the wedge-lock feature or pattern 2100 formed on the heel-interfacing surface 1820 of the top lift 120, 120'. The wedge-lock pattern 2100 can also be attached to the top lift 120, 120' as, for example, a metal washer having the wedge-lock pattern 2100. Because the top part of the top lift 120, 120' (the part that contacts the ground) is made of, for example, a material including rubber, having the wedge-lock pattern 2100 made from a more robust material, such as a material including metal or a hard plastic or other rigid material, allows a more secure and reliable interface to be established with the heel 114, 114'. When the wedge-lock pattern 2100 is formed as, for example, a metal or plastic washer, the metal washer is securely attached, such as by adhesive, to the rubber part of the top lift 120, 120'. As the heel-interfacing surface 1820 of the top lift 114, 114' mates with the corresponding wedge-lock pattern 2000 on the top 1818 of the heel 114, 114' as the top lift 120, 120' is being rotated to secure the threaded shaft 1802 inside the threaded insert 1814, the corresponding wedge patterns lock the two pieces 120, 120' and 114, 114' in a wedge-lock fashion together. The spring 1806 allows the wedge patterns 2000, 2100 to override one another briefly until they snap into a wedge-lock configuration as the threaded shaft 1802 is turned against the heel 114, 114'. The user or installer will receive tactile feedback as the wedge locks snap or click into place as the shaft 1802 is being tightened against the heel 114, 114'. Again, the spring 1806 provides some "give" to the shaft and top lift assembly to allow the wedges to override and lock into place. The number, shape, and position of the wedge locks in the patterns 2000, 2100 can be a function of the width of the heel 114, 114' and the outer contour shape of the heel 114, 114'.

In the final, secured position, the wedges of the wedge lock patterns 2000, 2100 are locked into place against one another, and held in tension against the top 1818 of the heel 114, 114' by the tension of the spring 1806 pushing against the fixed insert 1804, causing the shaft 1802 to be biased in a direction away from the top 1818 of the heel 114, 114' (e.g., in a direction opposite of direction D shown in FIG. 19).

A method of retrofitting an existing heel is also disclosed. A cobbler or user drills the opening 1812 into the heel 114, 114' if the opening is not already present there. The user inserts the threaded insert 1814, which can optionally have one or more outer flanges or wings, into the opening 1812, and then taps or hammers the threaded insert 1814 into the opening 1812, such as with the aid of a shank or punch to seat the threaded insert 1814 all the way into the opening 1812 in the installed position shown in FIG. 18. Then, the user inserts the spring 1806 against the insert 1814 through the opening 1812. To complete the heel assembly, the user inserts the insert 1804 through the opening 1812 and taps it into the opening against the spring 1806 until the insert 1804 is flush against the top 1818 of the heel 114, 114'. Optional adhesive can be applied to the insert 1804 prior to insertion to further anchor and secure it inside the bore 1812.

Now that the heel 114, 114' has been primed to receive the threaded shaft 1802, the user inserts the threaded shaft 1802 through the opening of the insert 1804, which then passes through the opening of the coil spring 1806, and finally can be screwed into the threads 1816 of the threaded insert 1814 at the distal end of the bore 1812. The user continues to rotate the threaded shaft 1802, such as by grasping the top lift 120, 120', to tighten the threaded shaft 1802 against the heel 114, 114'. Tactile and audible clicks can be felt and heard as the wedge locks 2000, 2100 secure the top lift 120, 120' against the top 1818 of the heel 114, 114'. When the outer profile or contour of the top lift 120, 120' and the heel 114, 114' has an irregular geometric shape, such as shown in FIGS. 20 and 21, the user continues to rotate the threaded shaft 1802 until the respective contours of the top lift 120, 120' and of the heel 114, 114' align.

To remove the top lift 120, 120', such as to replace a worn rubber tip or replace the entire top lift 120, 120' with a new one, the user counter-rotates the top lift 120, 120' in a direction to loosen the same from the threaded insert 1814 until the threads of the threaded shaft 1802 are free from the corresponding threads 1816 of the threaded insert 1814 and the threaded shaft 1802 can be removed from the opening 1812 and a new or replacement one can be installed. This embodiment is truly a do-it-yourself implementation, in which the wearer of the shoe can carry out the installation and/or replacement of top lifts 120, 120' by themselves without the need to seek out a cobbler or other professional. The entire assembly can be bundled together as a kit, together with a shank or punch that can be used to fully insert the threaded insert 1814 into the opening 1812. Importantly, replacement of an old top lift and installation of a new top lift can be carried out simply by manually (e.g., by human hand) unscrewing the old top lift and manually screwing in a new top lift without requiring any tools whatsoever.

FIGS. 22A-22D show an exemplary heel tip assembly 102, 102' having a top lift 120, 120' comprising a rigid shaft 2202 and insert 2210. Insert 2210 can be made of metal, plastic, or any 3D-printing material. Insert 2210 can be sized and shaped to fit within an opening in a heel (for example, the opening as discussed with respect to FIGS. 18-19). Insert 2210 can comprise an elastic element 2214 and a hollow interior (shown in FIG. 22C) with a threaded interior 2212. As a brief overview of the heel tip assembly of FIGS. 22A-22C, the assembly provides for a user inserting the insert 2210 into a heel 114, 114' (heel 114, 114' is not pictured). The user can then put the rigid shaft 2202 through the hollow interior of the insert 2210 until the threaded end portion 2204 of the rigid shaft 2202 engages with the threaded interior 2212 of the insert 2210. The user can screw the rigid shaft 2202 into the insert 2210 until the rigid shaft 2202 cannot be rotated further. During the screwing motion, the elastic portion 2214 will be pulled downwardly (toward the top lift 120, 120') onto the rigid shaft 2202. This will cause the restorative force of the rigid shaft to exert an upward pressure on the rigid shaft 2202. The various components of the assembly are discussed in greater detail below.

The elastic element 2214 can be shaped as a spring or another cutaway design. The elastic element 2214 provides a restorative force to return to an original, uncompressed configuration when the elastic element 2214 is compressed by, e.g., a user or pressure from the rigid shaft 2202. In some examples, elastic element 2214 can be a coil or helical spring designed for compression and tension. Such a spring can be designed to operate with a compression load, so that the spring compresses and becomes shorter as a load is applied to it. Therefore, as insert 2210 receives rigid shaft 2202, the screwing motion of 2202 will pull down, or compress insert 2210, and more specifically, compress at the elastic element 2214. Therefore, elastic element 2214 will exert an upward pressure to uncompress. This upward pressure will pull rigid shaft 2202 further into the heel 114, 114'.

In other examples, elastic element 2214 can be a torsion spring, configured to receive a load by a torque or twisting force. Therefore, when rigid shaft 2202 is screwed into the threaded interior 2212, one end of the elastic element 2214 can be configured to rotate or twist through an angle, for example, rotate clockwise. This rotating motion of the elastic element 2214 can cause elastic energy to be stored in the elastic element 2214. The elastic element 2214 can then cause the elastic insert 2210 (and the now-attached rigid shaft 2202) to press upward into the heel 114, 114' as it is pulled by the torsion's spring pressure to rotate counter-clockwise and return to an original spring state. In some examples, elastic element 2214 can therefore be a torsion spring consisting of torsion fiber, an elastic metal or rubber configured to absorb spring energy.

A person skilled in the art understands that elastic element 2214 can be many other types of springs, such as a variable spring, a serpentine spring, a volute spring, a Belleville spring, and/or a main spring. In some instances, elastic element 2214 can be an elastic material such as any elastomer, natural rubber, synthetic rubber, nitrile rubber, silicone rubber, urethane rubbers, chloroprene rubber, an elastic metal, and any combination thereof. Elastic element 2214 can additionally have many shapes, including a helix shape, a spiral, a grid shape, a conical shape, zig-zag shape, non-coiled, and/or flat. Additionally, elastic element 2214 can be solid element, with no cut-away design, relying solely on the elasticity of the elastic element's 2214 material.

Rigid shaft 2202 can include a threaded end portion 2204. The threaded end portion 2204 can be sized and shaped to fit within the hollow interior of insert 2210 and to engage with the threaded interior 2212 during the screwing motion. In some examples, the rigid shaft 2202 can have a wedge-lock feature or pattern 2000 configured to match a heel-interfacing surface 2216 of the top lift 120, 120' (as discussed earlier with regards to FIGS. 28-21). Therefore, these patterns 2000 and 2216 can be corresponding shapes such that when the insert 2210 receives the rigid shaft 2202, the patterns 2000 and 2216 can engage each other. In some instances, when the threaded end portion 2204 is screwed into the insert 2210, there can be one or more clicks when the patterns 2000 and 2216 engage each other. This provides a user with tactile and audible feedback to ensure that the insert has properly received the rigid shaft 2202. Additionally, the patterns 2000 and 2216 can ensure perfect alignment between the rigid shaft 2202 and the insert 2210 such that the assembly as a whole aligns with a heel 114, 114'.

Therefore, a heel tip assembly 102, 102', as shown by FIGS. 22A-22D provides a dual element assembly 102, 102' which can be inserted by a user into a heel 114, 114' with ease. This assembly has a small number of components which makes it a quick and easy product to provide additional structural support to a heel 114, 114'. When inserted into a heel 114, 114' as described with respect to FIGS. 22A-22D, the assembly can provide a unitary (one piece) element configured to provide structure, stability, and support to heel 114, 114'. The assembly therefore cannot be disassembled into its individual pieces without a user exerting a force to unscrew the rigid shaft 2202; the force exerted by the user needs to be stronger than the force exerted by the elastic portion 2214 that is pulling the rigid shaft 2202 back into the heel 114, 114'.

Figure 23A:
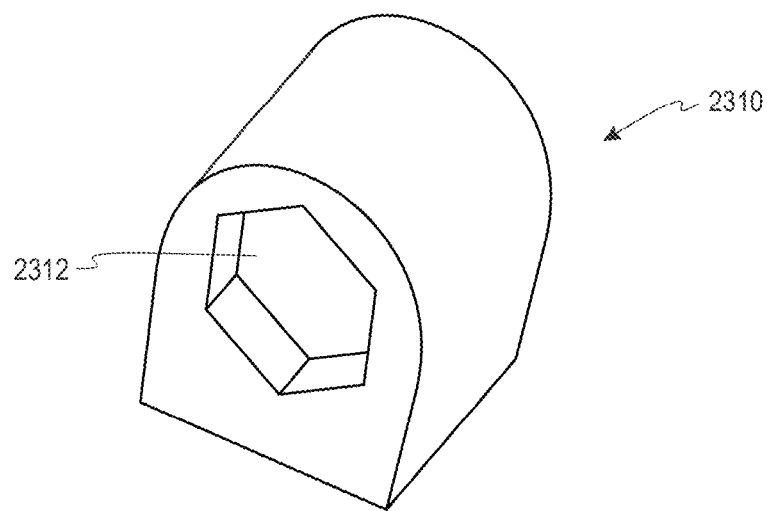
FIGS. 23A, 23B, and 23C show another exemplary heel tip assembly according to another embodiment of the present disclosure.
Figure 23B:
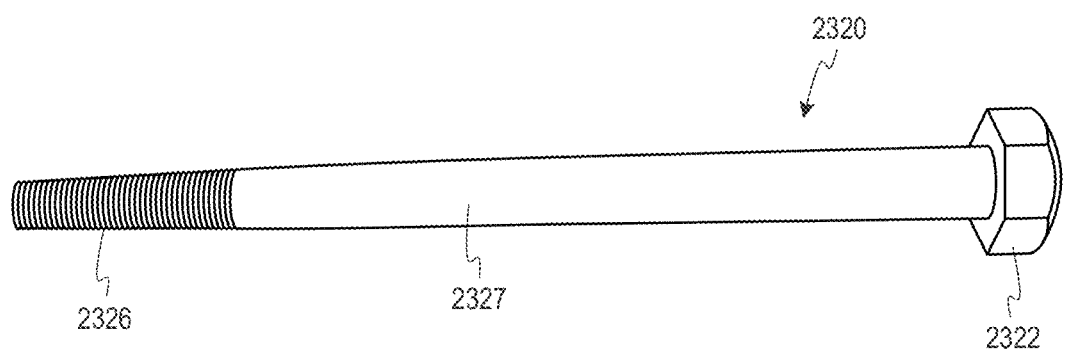
Figure 23C:
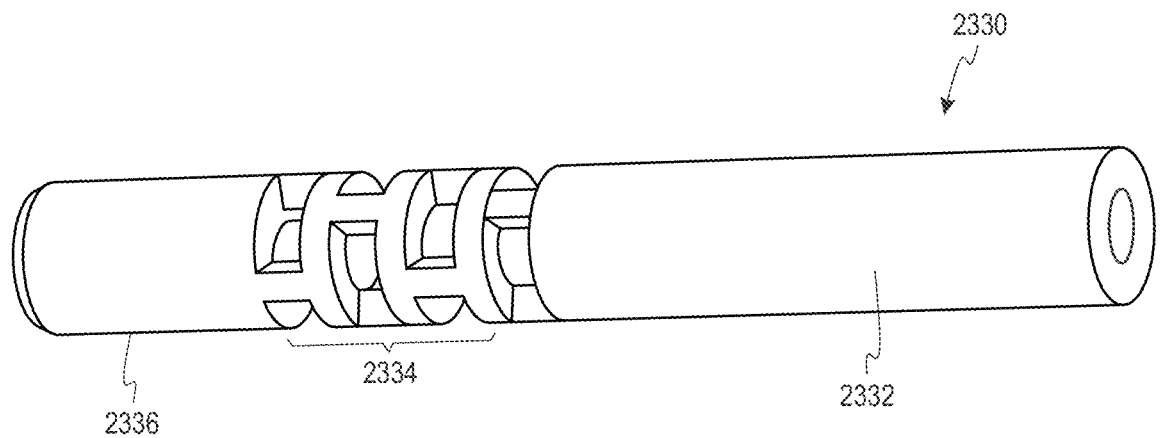

FIGS. 23A, 23B, 23C, and 24 show another exemplary heel tip assembly 102, 102', according to another embodiment of the present disclosure. The assembly, as shown in FIG. 24, can include a heel tip 2310 (FIG. 23A), a shaft piece 2320 (FIG. 23B), and an elastic insert 2330 (FIG. 23C). All three components 2310, 2320, and 2330 can be 3D-printed, constructed in a plastic mold, or any other similar process, without limitation. Components 2310, 2320, and 2330 can be made of tire tread material, rubber, plastic, and metal, any combination thereof, and any similar material. Components 2310, 2320, and 2330 can be made of the same or different materials. Generally, the elastic insert 2330 can be placed inside an opening in a heel which is a similar size to the elastic insert 2330. The shaft piece 2320 can be screwed into the elastic insert 2330. The heel tip 2310 can be placed onto the shaft piece 2320. Therefore, the heel tip assembly as shown in FIGS. 23A-23C and 24 can form a structural insert and sole for a high-heeled shoe. Additional features are discussed further below.

FIG. 23A shows an exemplary heel tip 2310 which can include a cutout portion 2312. The heel tip 2310 can be shaped to match a contour of the heel which heel tip 2310 is ultimately secured. The cutout portion 2312 can be sized and shaped to receive the shaft piece 2320. The cutout portion 2312 can be a hexagonal shape, for example, although any other circular or polygonal shape is contemplated as well. The heel tip 2310 can be rotated when connecting to the shaft piece 2320 such that the heel tip 2310 aligns with the contour of the heel.

FIG. 23B shows an exemplary shaft piece 2320 which can include a shaft head 2322, a shaft body 2324, and a threaded portion 2326. The shaft head 2322 can be configured to match the shape and size of the cutout portion 2312 such that shaft head 2322 forms an interference fit with cutout portion 2312. The heel tip 2310 can be put onto the shaft head 2322 by a user or installer. The threaded portion 2326 can be configured to match a threaded sleeve 2336 of the elastic insert 2330.

FIG. 23C shows the elastic insert 2330, which can include a shaft portion 2332, an elastic portion 2334, and a threaded sleeve 2336. The elastic insert 2330 can have a hollow interior with which to receive the shaft piece 2320. The shaft portion 2332 can protect the shaft piece 2320, as it is received by the elastic insert 2330, from rubbing against a heel in which the elastic insert 2330 is inserted. The threaded sleeve 2336 can receive the threaded portion 2326 of the shaft piece 2320. While the shaft piece 2320 is screwing into the threaded sleeve 2336, the elastic portion 2334 can be compressed and rotated. The elastic portion 2334 can provide a resultant force pulling the shaft piece 2320 deeper into the hollow interior of the elastic insert 2330. The interference fit between the elastic insert 2330 and the heel can prevent the elastic insert 2330 from rotating to relieve the elastic force caused by the shaft piece 2320. In some examples, an adhesive element can be placed on the exterior of the elastic insert 2330 before it is inserted into a heel to further prevent the elastic insert 2330 from rotating.

Elastic portion 2334 can be a variety of shapes and sizes although only one shape and size is demonstrated in FIGS. 23C-24. The elastic portion 2334 can shaped as a spiral, a spring, a grid shape, an off-center grid, or a lattice or lattice-like structure. The elastic portion 2334 can have cutaway portions in the shape of rectangles (as shown in FIG. 23C), ovals, helices, spirals, honeycomb, or any other cutaway form. Elastic portion 2334 can have a regular and symmetrical shape (as shown in FIG. 23C), or an irregular, a symmetrical shape (e.g., a spiral where top portions of the spiral are more spaced out than lower portions). In some cases, elastic portion 2334 can be solitary curved lines rising from the shaft portion 2332 to the curved portion 2336. Design shapes can be chosen according to weight, material, and elasticity concerns. Elastic portion 2334 can further include all the non-limiting exemplary embodiments as discussed with respect to elastic element 2214 of FIGS. 22A-22C. The elastic portion 2334 preferably has a regular, repeating pattern or shape so that the elastic portion 2334 compresses or expands uniformly about a cross section thereof without breaking or crushing any vertical members or elements of the pattern or shape that provides or imparts the elasticity or springiness to the elastic portion 2334. The design or pattern of the elastic portion 2334 can be selected based on suitability for being made according to 3D printing methods. The entire insert 2330 together with the elastic portion 2334 shown in FIG. 23C can be a unitary, one-piece integral structure, for example, constructed according to a 3D printing method. The elastic portion 2334 can have a lattice-like pattern having compressible members that can be restored to a pre-compressed state without being crushed or broken.

FIG. 24 demonstrates how the three pieces, as shown individually in FIGS. 23A-23C can cooperate to provide structure, stability, and support to a heel 114, 114' when the elements are assembled. The assembly cannot be disassembled into its individual pieces without a user removing the heel tip 2310 and exerting a force to unscrew the shaft piece 2320 from the elastic insert 2330; the force exerted by the user needs to be stronger than the force exerted by the elastic portion 2334 that is pulling the shaft piece 2320 back into the heel 114, 114'.

Any of the top lifts disclosed herein can be used in connection with any of the heels, and any anti-rotation feature can be combined with any alignment feature and/or any securing feature and/or any cushioning feature disclosed herein. It is seen that the combination of these features contributes to the overall stability, wearer comfort, noise suppression, longevity, customizability or interchangeability, facile and expedient construction and manufacturability, and repairability or serviceability, to name a few benefits, of the high heel footwear, particularly over prolonged usage. The honeycomb pattern provides a cushioning effect, a tire tread top (facing the ground) provides a grip or anti-slipping feature while also suppressing the sound the heel makes when contacting a ground surface, such as a polished floor or tile, the various securing features provide a secure way of interfacing the top to the heel, sometimes in a way that is reversible, and the alignment features ensure that the outer contour of the top lift and heel at their interface match so that no visual artifacts are perceived. The alignment should be made blindly so that the manufacturer or installer can quickly secure the top lift to the heel without having to make minor adjustments to ensure co-alignment. The alignment feature also stands up to prolonged wear and tear over time, ensuring that the top lift and heel remain aligned. The anti-rotation features disclosed herein prevent rotation of the top lift relative to heel, which prevent twisting moments and misalignment of the top lift relative to the heel over prolonged use. The various materials used, such as tire tread material, rubber, plastic, and metal, can be interfaced together securely or permanently by adhesive or any other technique for interfacing such materials to metal. The embodiments of FIGS. 18-24 provide a do-it-yourself assembly that allows the wearer of the footwear to retrofit an existing footwear with a replaceable heel tip that can be secured to the heel and then removed easily and replaced with a new one. Alternately, the heel of the footwear can be adapted by the manufacturer to include the internal components described above in connection with FIGS. 18-19 and 23B-23C, and then the wearer can readily replace him—or herself the heel tip with a new one by simply unscrewing and removing the old one and installing a new one merely by screwing the new one in with absolutely no tools required.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

The invention claimed is:

1. An assembly for footwear, comprising:
   a heel tip assembly, which includes:
      a top lift configured to abut an end of the heel of the footwear, the top lift being composed of a material that is compressible or deformable;
      a rigid shaft assembly including a head and a rigid shaft member having a shaft body and a threaded portion extending away from the top lift, the head being securely embedded into the top lift,
      the rigid shaft assembly including a first pattern configured to prevent the top lift from rotating relative to the heel in response to the heel tip assembly being held in tension against the heel; and
   a heel assembly, which includes:
      an insert assembly having a threaded insert portion, a compressible elastic portion adjacent to the threaded insert portion, and a hollow insert portion adjacent to the compressible elastic portion, the insert assembly being configured to be received inside an opening of the heel;
      wherein the threaded insert portion is configured to threadingly engage the threaded portion of the rigid shaft member;
      wherein the compressible elastic portion is configured to receive therethrough a first portion of the rigid shaft member;
      wherein the hollow insert portion is configured to receive therethrough a second portion of the rigid shaft member, the insert assembly including a second pattern configured to engage with the first pattern of the rigid shaft assembly to align the top lift with the end of the heel,
      wherein the compressible elastic portion is configured to compress as the threaded portion of the rigid shaft member threadingly engages the corresponding threaded insert portion of the insert to thereby hold the top lift in tension against the heel assembly.

2. The assembly of claim 1, wherein the rigid shaft assembly and the insert assembly are composed of a material that includes a metal.

3. The assembly of claim 1, wherein the compressible elastic portion is a coil or helical spring.

4. The assembly of claim 1, wherein the first pattern is a wedge-lock pattern and the second pattern is a wedge-lock pattern.

5. The assembly of claim 1, wherein the first wedge-lock feature is composed of a material including a metal and secured to the top lift.

6. The assembly of claim 1, wherein the top lift is composed of a material that includes rubber.

7. The assembly of claim 1, wherein the first pattern and the second pattern are configured to snap or click into place as the threaded portion threadingly engages the threaded insert portion.

8. The assembly of claim 7, wherein top lift has an outer contour that matches an outer contour of the end of the heel.

9. The assembly of claim 1, wherein the compressible elastic portion includes a lattice structure or has a grid shape.

10. The assembly of claim 1, wherein the compressible elastic portion includes a plurality of compressible members configured to be restored to a pre-compressed state without being crushed or broken.

11. The assembly of claim 1, wherein the compressible elastic portion includes a regular, repeating pattern or shape so that the compressible elastic portion compresses or expands about a cross section thereof without breaking or crushing any members or elements of the compressible elastic portion.

12. A method of retrofitting an existing heel tip in a heel of a footwear with an assembly of claim 1, comprising the steps of:
   removing the existing heel tip from the heel of the footwear to expose a hole or bore of the heel;
   inserting the insert assembly through the opening of the heel into the hole or bore of the heel;
   tapping the insert assembly until it is flush with the end of the heel;
   inserting the rigid shaft member through the hollow insert portion of the heel assembly;

rotating the threaded portion of the heel tip assembly by grasping the top lift and turning the top lift so that the threaded portion threadingly engages the threaded insert portion to compress the compressible elastic portion;

responsive to feeling or hearing a click or snap once the first pattern engages with the second pattern until an outer contour of the top lift is aligned with an outer contour of the heel; and releasing the top lift to cause the top lift to be held in tension against the heel by virtue of the compression of the compressible elastic portion.

* * * * *